(12) United States Patent
Throener

(10) Patent No.: US 6,702,532 B1
(45) Date of Patent: Mar. 9, 2004

(54) CARGO RESTRAINING DEVICE

(76) Inventor: James A. Throener, 5501 Old Floydsburg Rd., Crestwood, KY (US) 40014

( * ) Notice: Subject to any disclaimer, the term of this patent is extended or adjusted under 35 U.S.C. 154(b) by 0 days.

(21) Appl. No.: 09/361,454

(22) Filed: Jul. 26, 1999

(51) Int. Cl.⁷ .................................................. B60P 7/08
(52) U.S. Cl. ........................... 410/94; 410/90; 410/121
(58) Field of Search .............................. 410/94, 95, 90, 410/91, 121, 155; 224/42.33, 403; 188/32; 248/351, 357

(56) References Cited

U.S. PATENT DOCUMENTS

| | | | | |
|---|---|---|---|---|
| 999,828 A | * | 8/1911 | McNaughton | 410/94 |
| 1,559,827 A | * | 11/1925 | Wittman | 410/121 |
| 3,861,541 A | * | 1/1975 | Taff et al. | 410/90 X |
| 4,027,892 A | * | 6/1977 | Parks | 410/121 X |
| 4,147,112 A | * | 4/1979 | Green et al. | 410/94 |
| 4,311,420 A | | 1/1982 | Hendricks et al. | 410/121 |
| 4,756,651 A | * | 7/1988 | Van Gompel et al. | 410/121 X |
| 4,838,745 A | * | 6/1989 | Haydock | 410/121 |
| 4,842,460 A | * | 6/1989 | Schlesch | 410/121 |
| 5,549,428 A | | 8/1996 | Yeatts | 410/94 |
| 5,636,951 A | | 6/1997 | Long et al. | 410/85 |
| 5,655,863 A | | 8/1997 | Mnundt | 410/94 |
| 5,795,006 A | | 8/1998 | Beckstrom | |
| 5,839,863 A | * | 11/1998 | Johansson | 410/94 X |
| 5,865,580 A | * | 2/1999 | Lawrence | 410/118 |
| 5,871,316 A | * | 2/1999 | Bills | 410/42 |
| 6,007,282 A | * | 12/1999 | Mundt | 410/94 |
| 6,012,885 A | * | 1/2000 | Taylor et al. | 410/94 |

* cited by examiner

*Primary Examiner*—Stephen T. Gordon
(74) *Attorney, Agent, or Firm*—Carrithers Law Office; David W. Carrithers

(57) ABSTRACT

A cargo restraining device for use in tine cargo areas of vehicles, trailers, and boats for holding cargo secure and resist sliding and tipping of the cargo placed on a flat surface therein. The restraining device includes a lower portion and an upper portion. The lower portion comprises material having a coefficient of friction for enhanced adhesion against a metal, carpet or plastic supporting surface. The box, container, or cargo (item) is placed on flop of the lower portion of the restraining device which is deposed between the box and supporting surface. This will cause the cargo item to resist movement. The upper portion of the restraining device consists of a rigid material integrally attached to the lower portion making the bond as strong as the lower portion and mechanically locking the two materials together. Thus transferring any energy applied to the upper portion to the lower portion. The upper portion will be a wedge shape to add stability to the vertical surface of the cargo, which will resist tipping. This will also increase the active area of the lower portion. By using the wedge shape for the upper portion the active area to resist tipping and sliding is increased. The bottom surface of the lower portion can employ a number of different textures or patterns to increase friction. The different materials that can be used for the lower surface can have a wide variety of physical properties.

44 Claims, 21 Drawing Sheets

CARGO RESTRAINING DEVICE

BACKGROUND OF THE INVENTION

Technical Field

This invention relates to hand tools, specifically to such tools which are used for securing and holding cargo in the bed of a truck such as a pick-up truck to resist sliding and movement of the cargo therein.

Description of Prior Art

The cargo area of most vehicles is a metal painted surface or surface covered with carpet or plastic. Most items (cargo) which are transported in vehicles are cover or contained in cellulose or plastic material. This does not provide much resistance when the transporting surface and the cargo are in contact. The combination of these surfaces is excellent for the loading and unloading cargo. The movement of cargo during transport can cause damage to the cargo or transporting area, spillage of the cargo, or a distraction to the operator driving the vehicle to mention a few. Each of the instances mentioned above equates to additional time required whether it be clean-up, repair, extra handling, frustration, or a safety issue when cargo does not remain in close proximity or position where it was loaded. Different style mats or devises have been used in the past to reduce the movement of cargo. Items used to cover the transporting surface that reduce the movement making it difficult to slide cargo during loading and unloading. The covering also makes it difficult and inconvenient to clean the cargo area of a vehicle. Current devices used to keep cargo in place can be difficult to store when not in use or are specialized to work with other products to be effective. Some devices require the transporting vehicle to physically altered by drilling or gluing.

Other known restraining devices generate their resistance from matching or using physical contours or characteristics of the transporting area.

SUMMARY OF THE INVENTION

The present invention can be used on a number of different surfaces, which means it is flexible in its use from vehicle to vehicle and can be easily stored. The invention can be used in any orientation or on any cargo and is independent of the design of the transporting surface.

The device has an upper block portion for abutting and holding the cargo in place and a lower planar portion providing a base which is held in place by the cargo. The base includes a reinforcement member embedded, inserted, or molded into a flexible material and designed to provide a rigid structure with a coefficient of friction higher than most packaging material. The base and/or upper block portion may be comprised of rigid material wherein the bottom surface of the base may consist of a softer flexible material attached thereto by molding, adhesion, welding, or other attachment means to enhance adhesion or grip to the surface supporting the cargo holding device and cargo. Of course, different areas of the same structure may be comprised of the same polymer molded together having different hardness, such as where an upper portion may be formed of "C" or "D" durometer hardness polyvinyl chloride and the bottom of the base is formed from "A" durometer hardness polyvinyl chloride having a similar composition, but containing more plasticizer providing enhanced flexibility.

The present invention relies on a contact plane between the transporting surface and the device to resist movement of the cargo when transporting. The bottom surface of the device may be smooth or textured but is not intended to match any physical shape of the transporting surface. The incorporation of an upper portion designed to contain the cargo and a lower portion composed of a suitable durometer material to increase friction on the top plane of a transporting surface enables the present invention to be more versatile and inexpensive to manufacture.

Bars or grooves can be incorporated in the lower portion of the base of the cargo restraining device for taking advantage of physical shapes of the transporting surface. This is not necessary, but can be done. The design of using a combination of different materials in the upper and lower portions this invention make molding the lower surface of the base in a particular shape economically feasible.

The present invention is designed to be flexible in its use to be used in different vehicle classes, trailers, trucks, and boats. The design of this invention can use materials with different physical properties as new ones are developed which may have greater cost effectiveness.

The objective of the present invention is to provide a device in which cargo will resist sliding and tipping. This is accomplished using this device which the cargo will rest on and against. The downward pressure of the cargo will transfer this pressure to the device, which will contact the transporting surface. The friction that is created by the device will resist motion. The device will also resist tipping by creating an opposing force when this action takes place. This is accomplished by using the device, which increases the distance between the cargo's center of gravity and the point of rotation (moment).

The present invention uses a unique way of attaching a material, which has a higher coefficient of friction than the cargo to rigid material. By doing this the weight of the cargo or the physical motion of the cargo against the rigid material is transfer to act against the higher coefficient of friction material. By using this method the device can work on numerous transporting surfaces.

It is an object of the present invention to provide a cargo restraining device which does not rely on a locking mechanics or locking mechanism to the transporting surface to hold the cargo n place.

It is an object of the present invention to not require a particular physical shape of the transporting surface.

It is an object of the present invention for the bottom surface plane to be independent and only requires the transporting plane.

It is an object of the present invention to be usable in infinite locations on the transporting vehicle surface due the fact it relies on a plane of contact.

It is an object of the present invention to provide a means of locating as close to the cargo as possible and place on the transporting surface wherever desired.

It is an object of the present invention to resist tipping.

It is another object of the present invention to provide an upper and lower portion that are mechanically locked together to form a uniform part.

BRIEF DESCRIPTION OF THE DRAWINGS

A better understanding of the present invention will be had upon reference to the following description in conjunction with the accompanying drawings in which like numerals refer to like parts throughout the several views and wherein.

Figure 1:
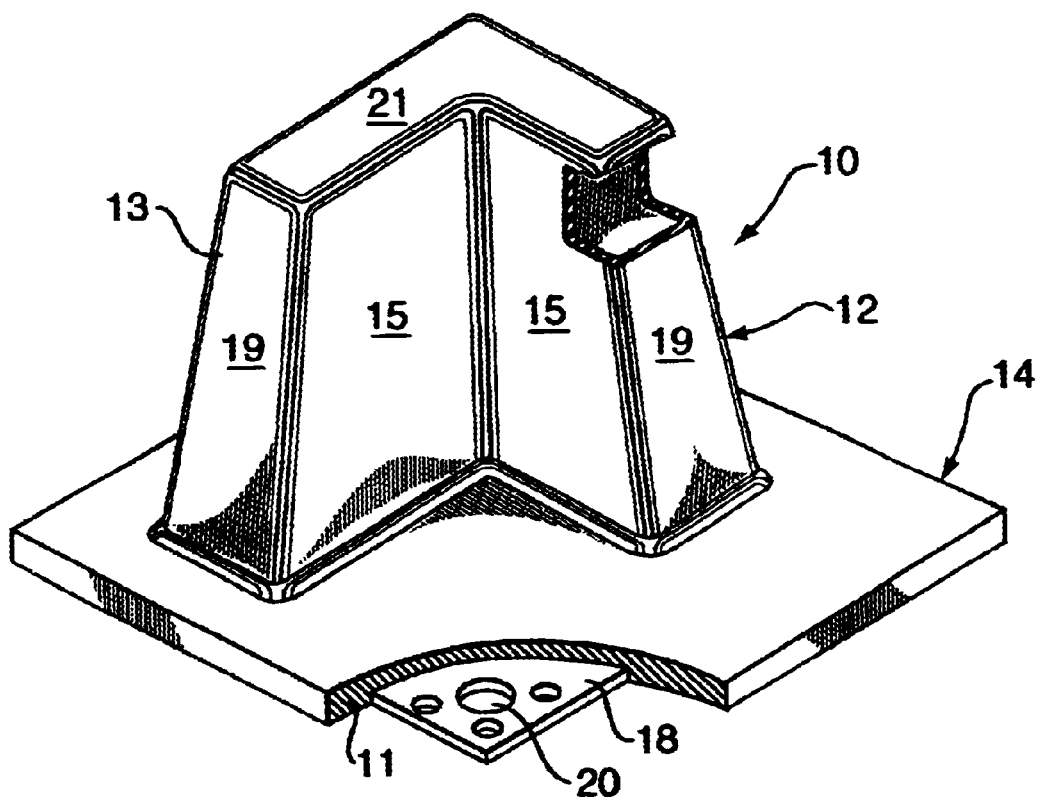
FIG. 1 shows a perspective view of the cargo restraining device with a partial cutaway of the base showing a resilient reinforcement member embedded therein and partial cutaway of the hollow upper body portion showing the side walls thereof.
Figure 2:
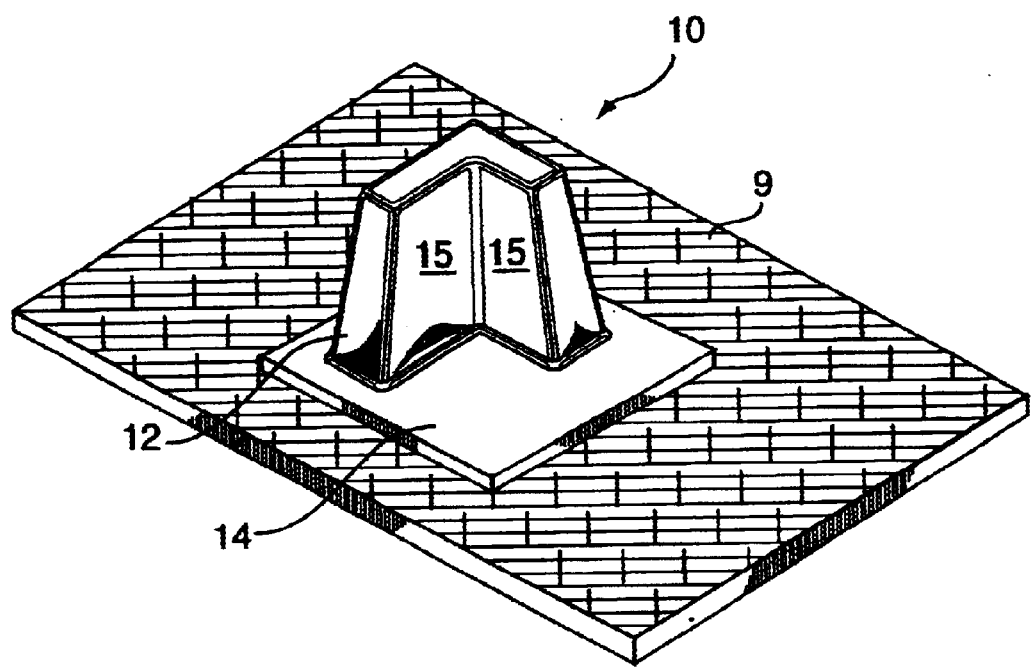
FIG. 2 is a perspective view of a common transporting surface of carpet and the cargo restraining device with the cross-section view below.
Figure 3:
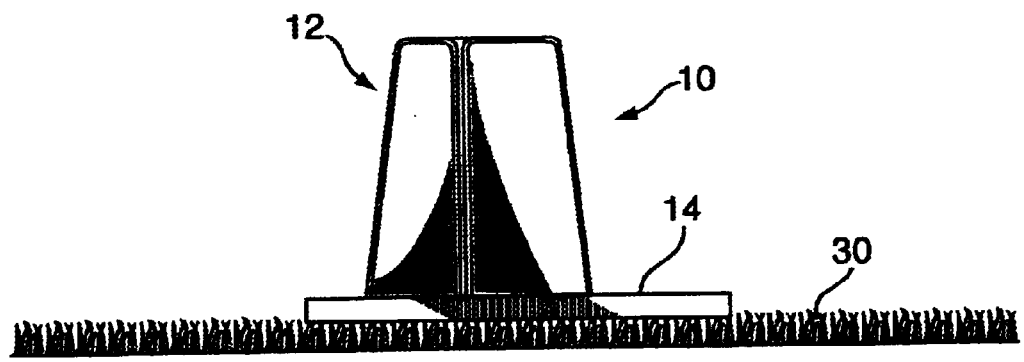
FIG. 3 is a side view of FIG. 2.
Figure 4:
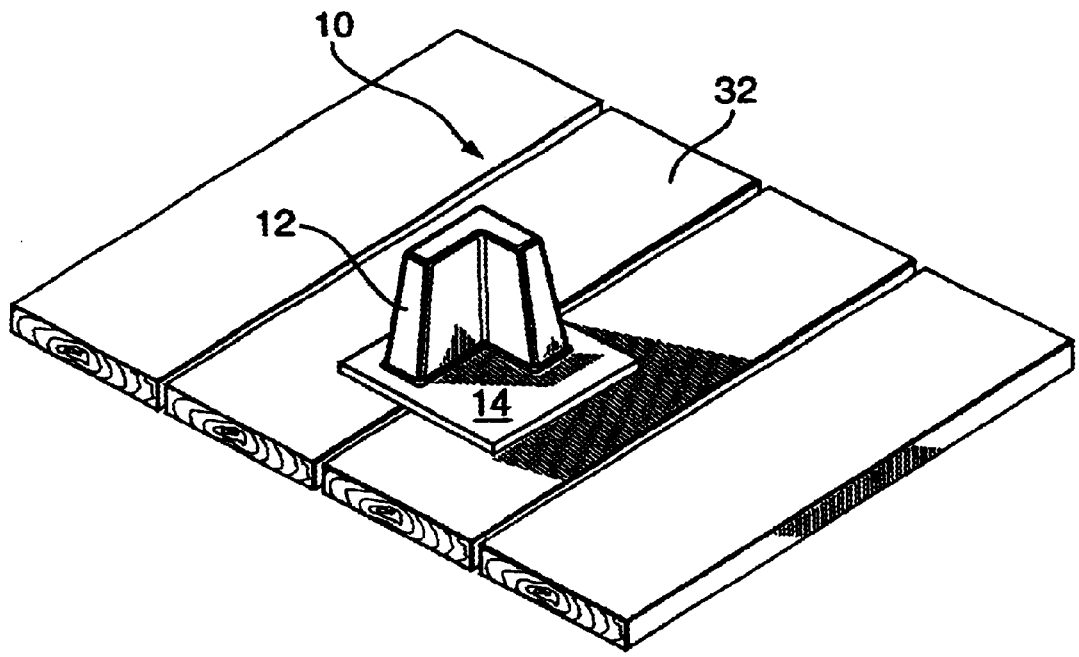
FIG. 4 is a perspective view of a common transporting surface of wood and the restrain device with the cross-section view below.
Figure 5:
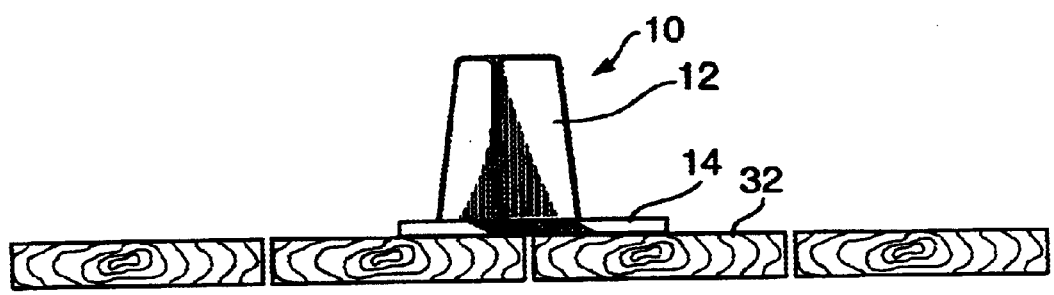
FIG. 5 is a side view of FIG. 4.
Figure 6:
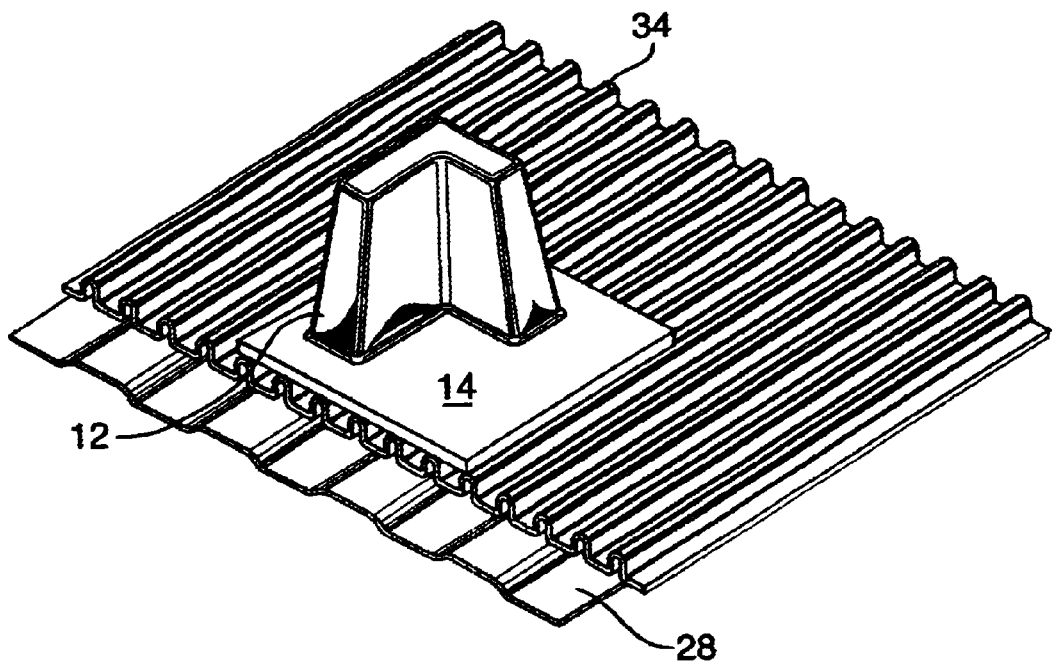
FIG. 6 is a perspective view of a common transporting surface of irregular shaped plastic and the restrain device with the cross-section view below.
Figure 7:
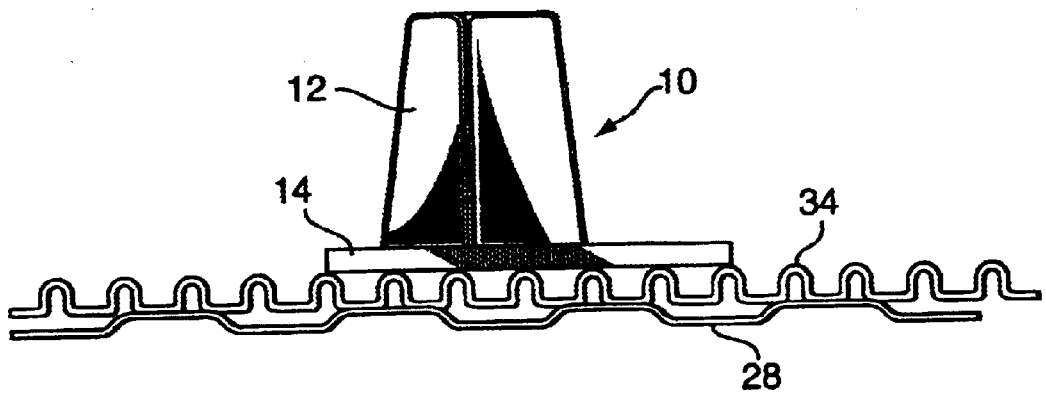
FIG. 7 is a side view of FIG. 6.
Figure 8:
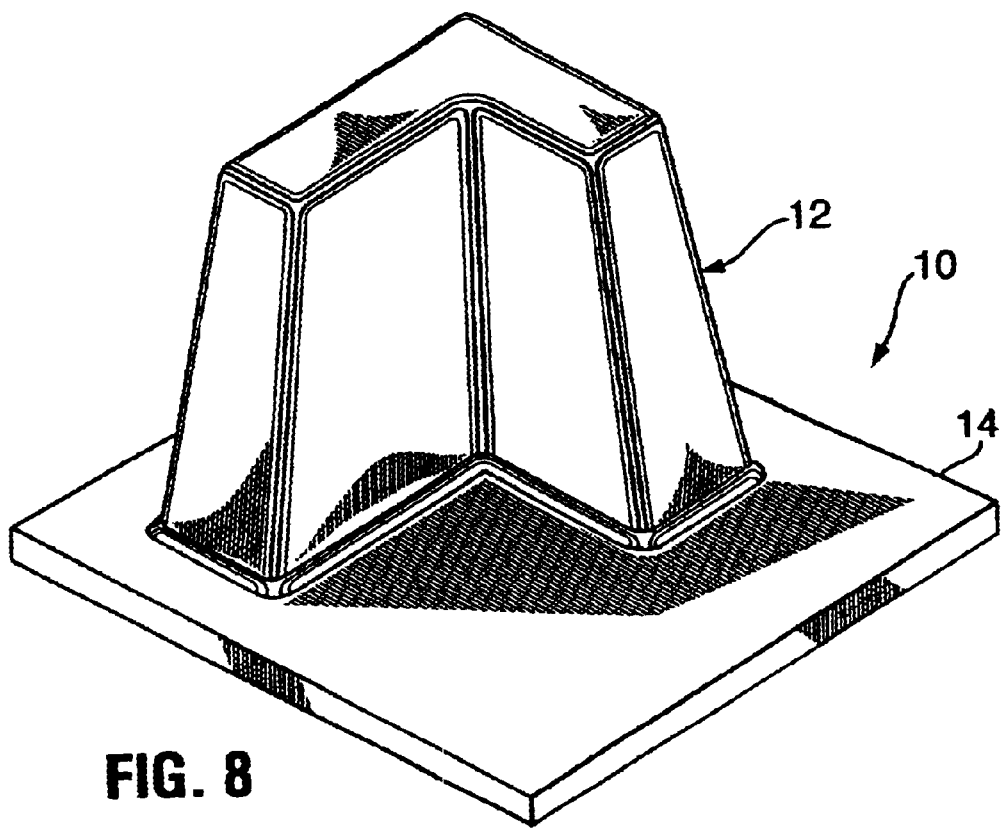
FIG. 8 is a perspective view of a preferred embodiment of the present invention.
Figure 9:
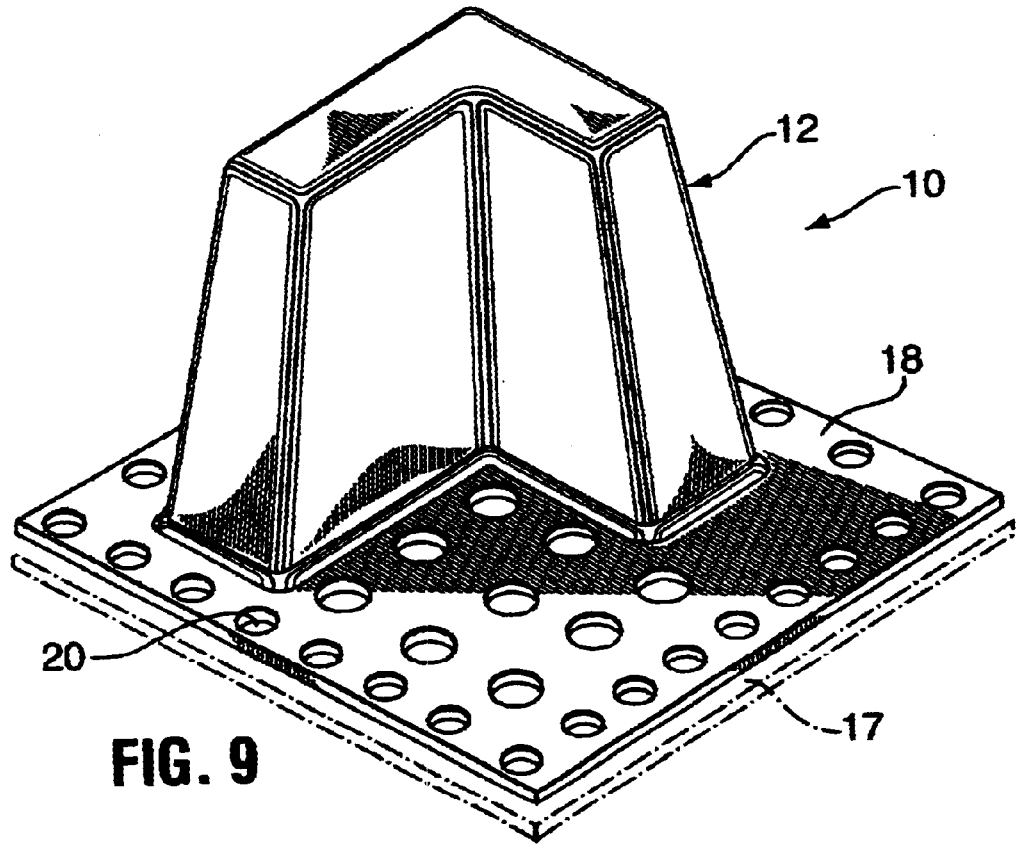
FIG. 9 shows a perspective view of the upper portion only, of the restraining device.
Figure 10:
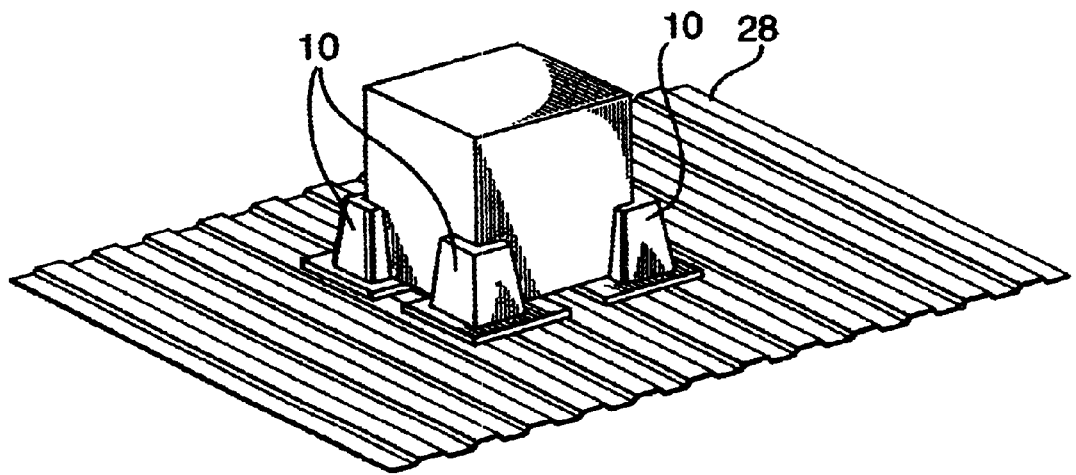
FIG. 10 shows a perspective view of the restraining device restraining cargo on a bed of truck.
Figure 11:
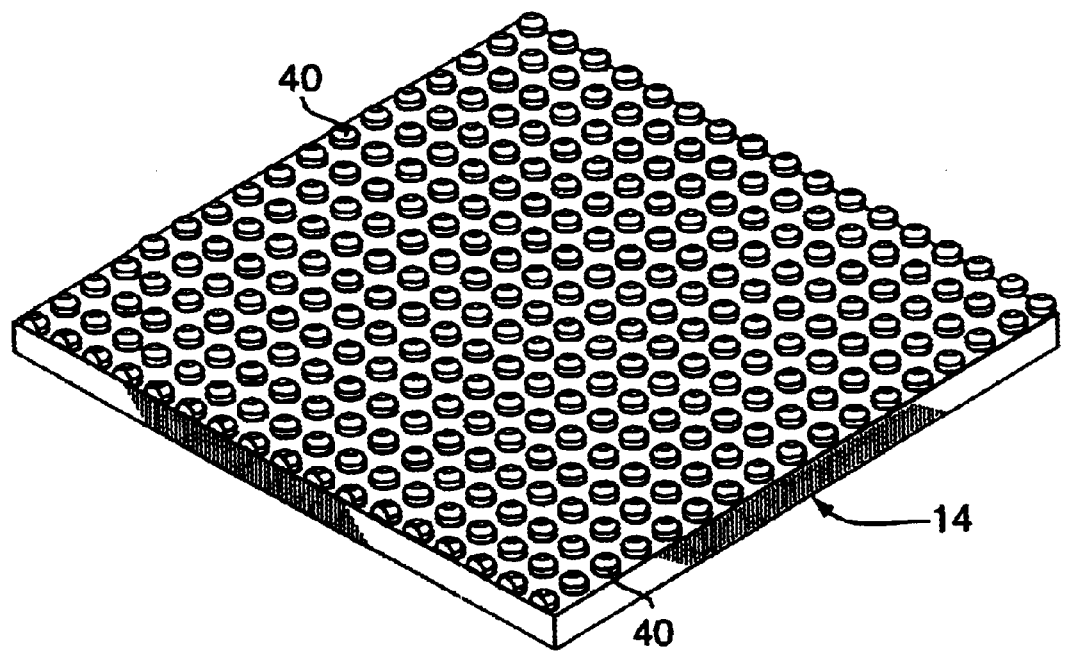
FIG. 11 shows a different texture of miniature hemisphere protrusions that could be used on the bottom surface of the device.
Figure 12:
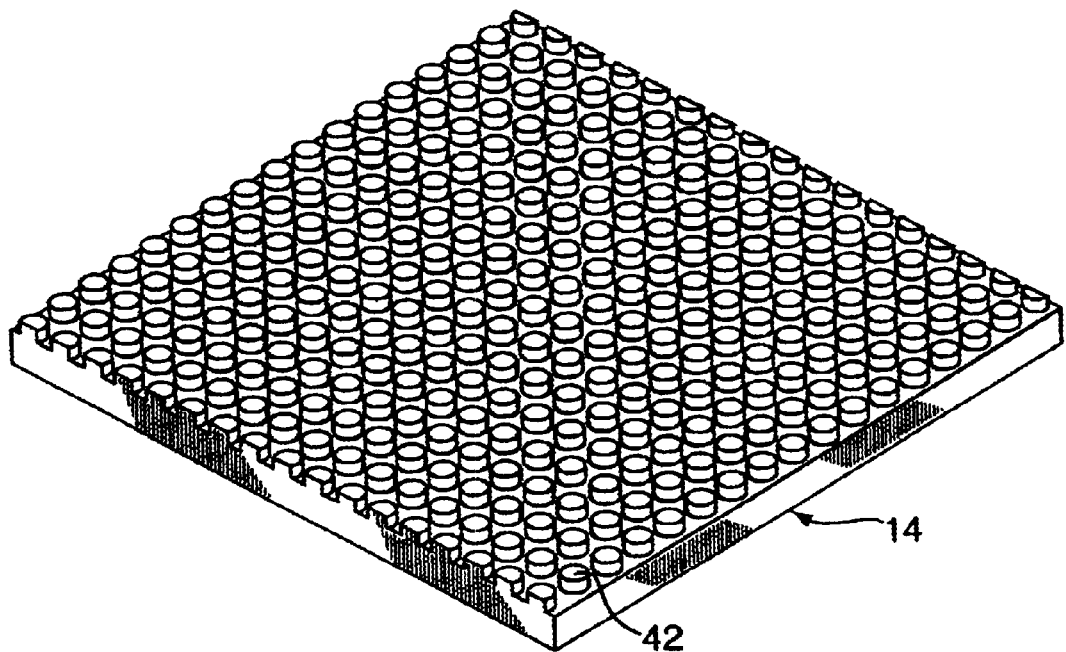
FIG. 12 shows a different texture of miniature circular protrusions that could be used on the bottom surface of the device.
Figure 13:
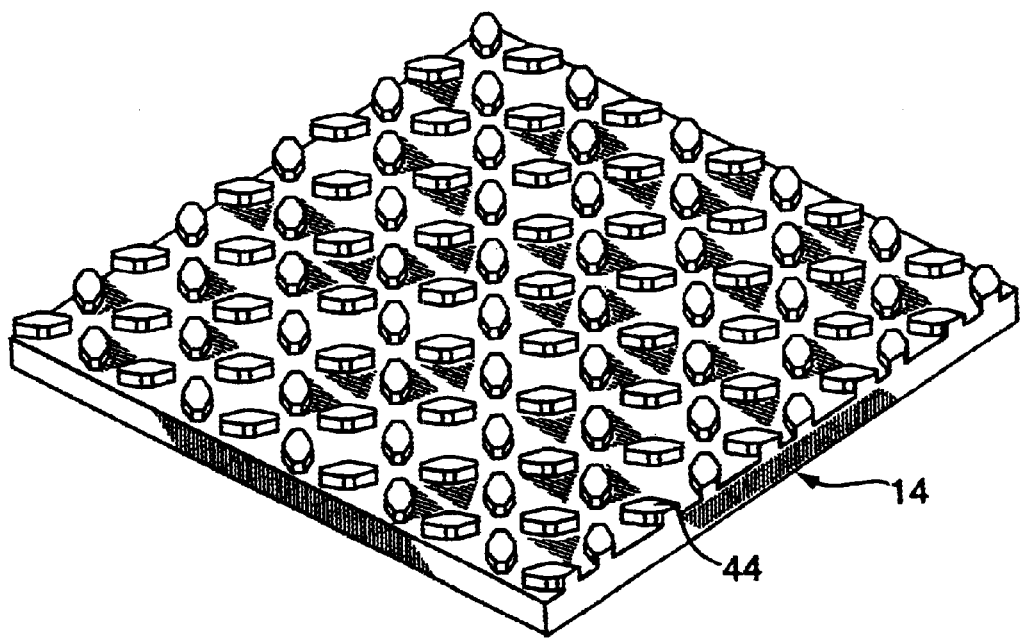
FIG. 13 shows a different texture of a diamond pattern protrusion that could be used on the bottom surface of the device.
Figure 14:
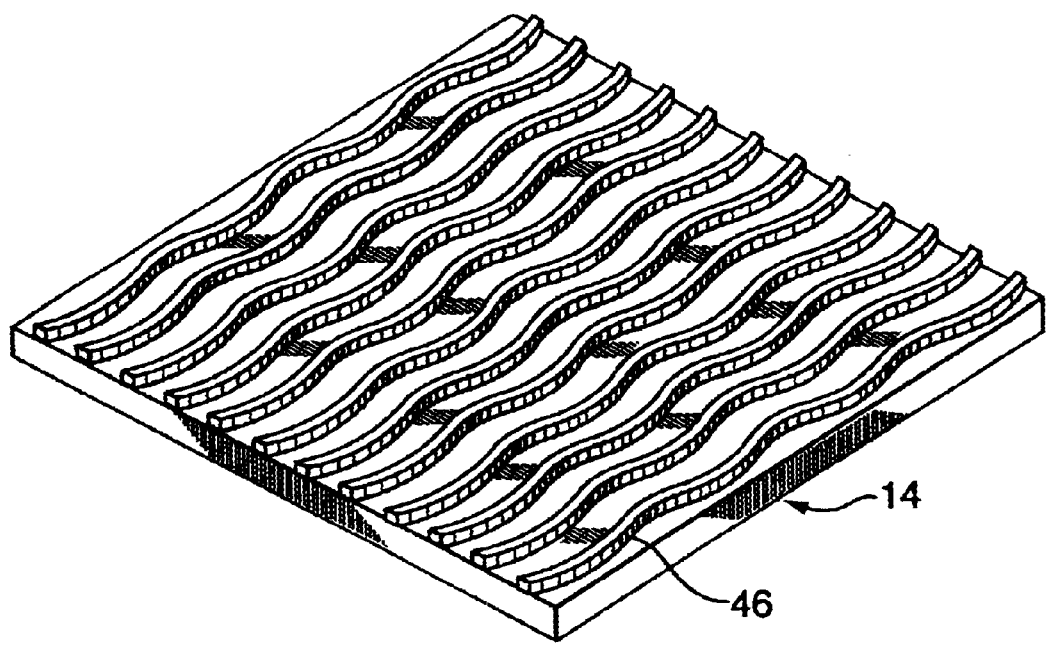
FIG. 14 shows a different texture of a wave pattern protrusion that could be used on the bottom surface of the device.
Figure 15:
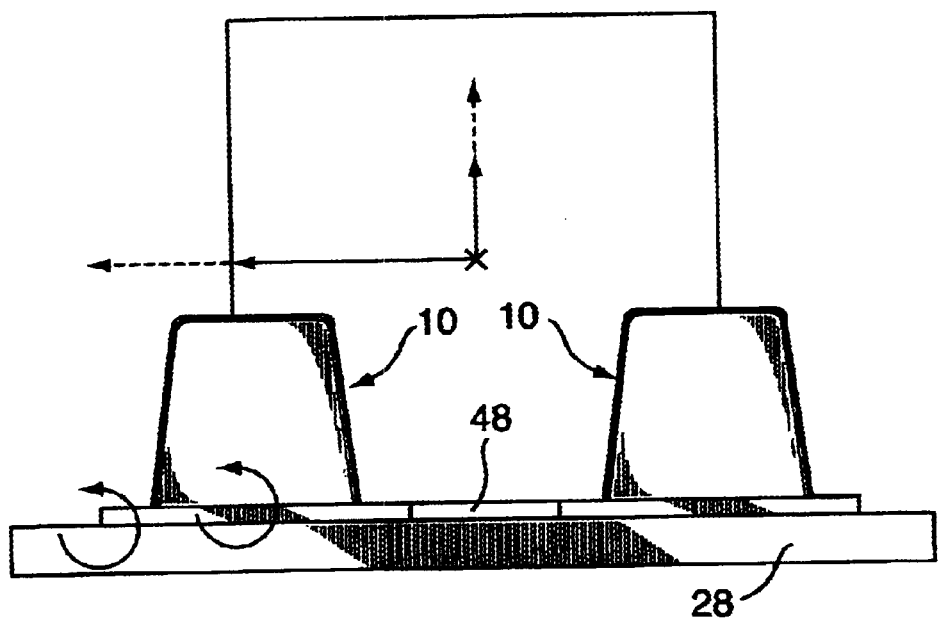
FIG. 15 shows the device on a transporting surface with the cargo imposing a tipping force against the upper portion of the device.
Figure 16:
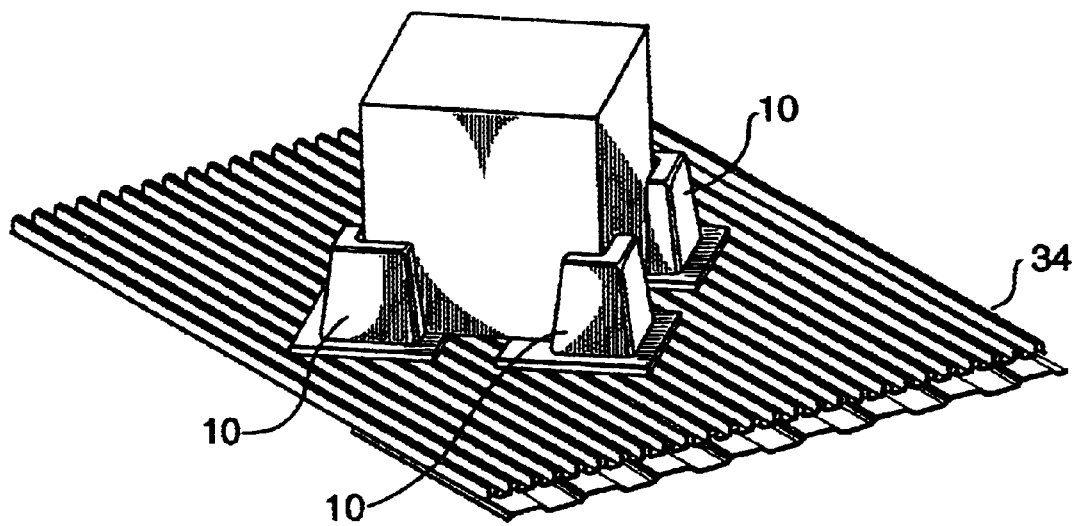
FIG. 16 shows the restraining device with cargo randomly placed on a truck bed liner.
Figure 17:
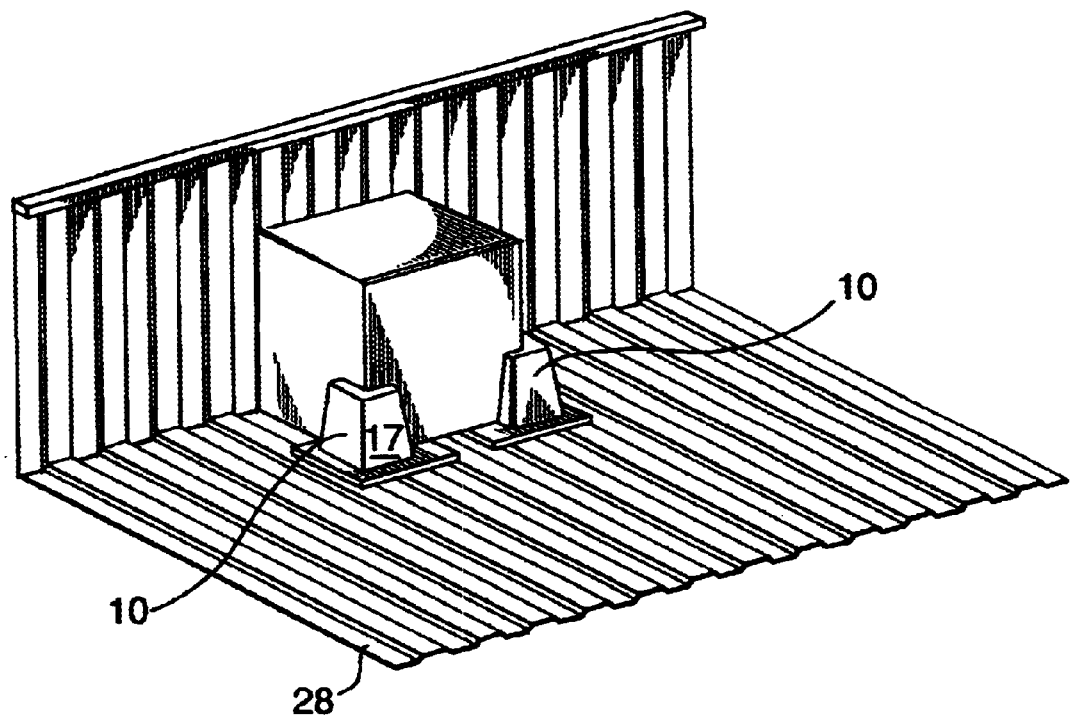
FIG. 17 shows the restraining device with cargo placed against the wall of the transporting area of a truck.
Figure 18:
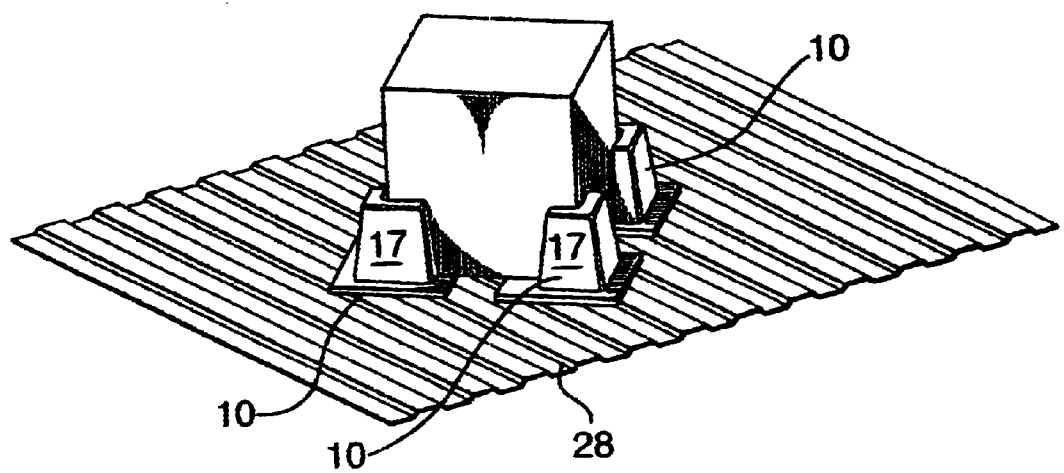
FIG. 18 shows the restraining device with cargo randomly placed on a truck bed.
Figure 19:
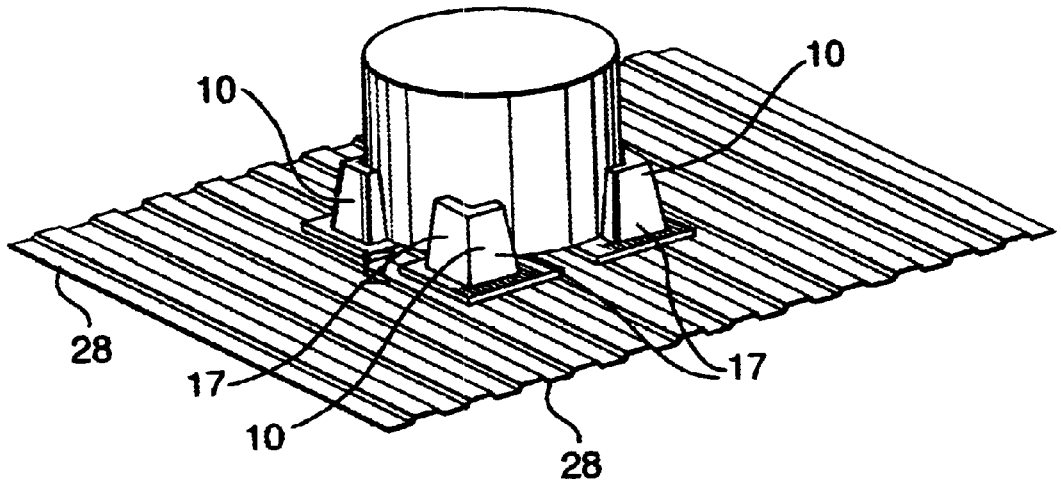
FIG. 19 shows a circular shaped cargo item with the restraining device place on a truck bed.
Figure 20:
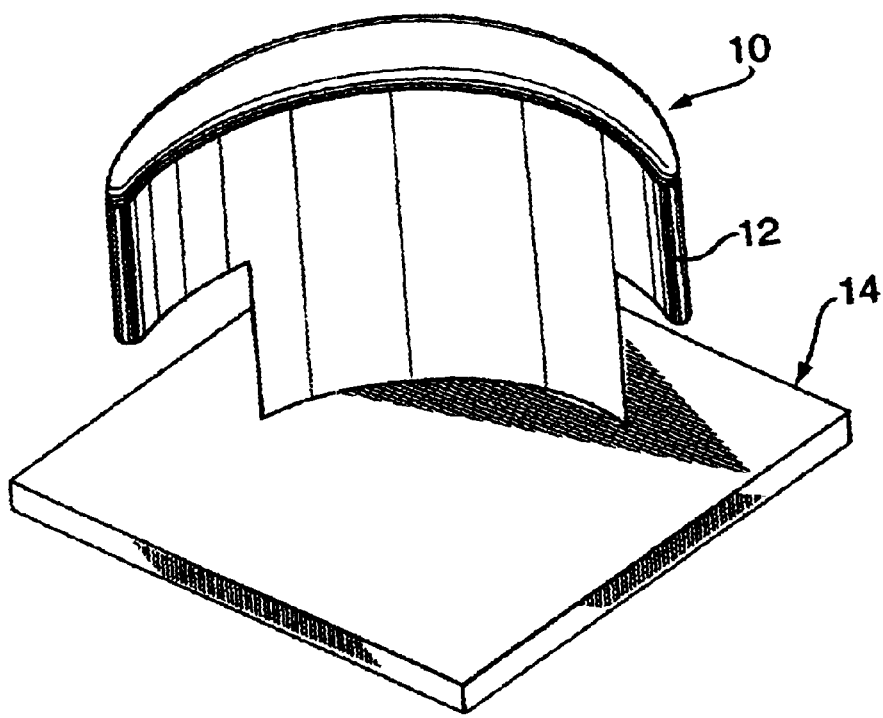
FIG. 20 shows different shaped upper portion that is used to retain circular shapes.
Figure 21:
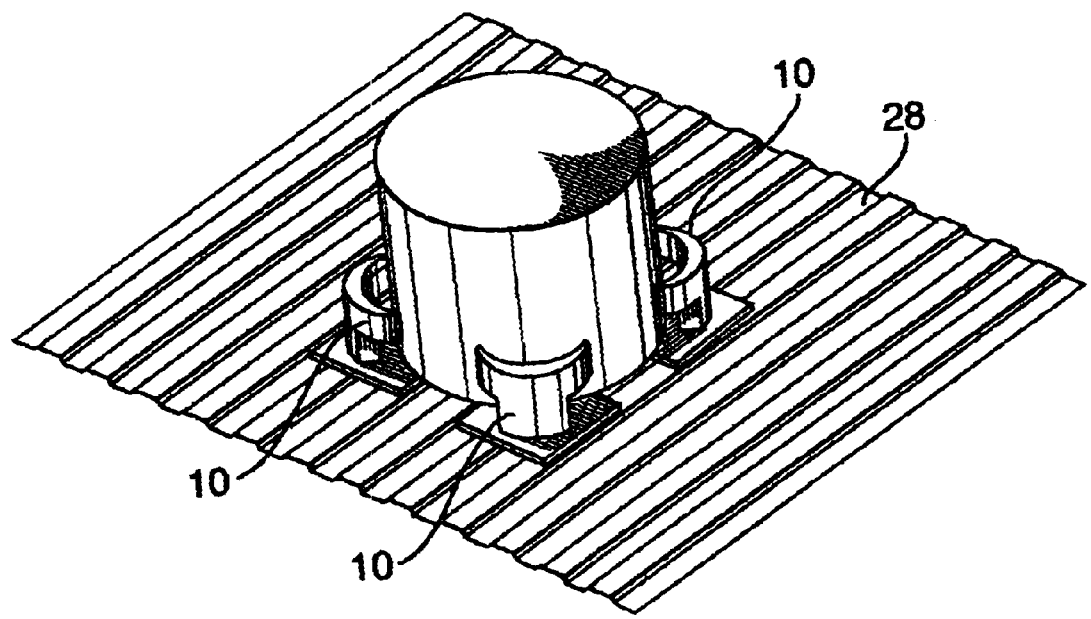
FIG. 21 shows a plurality of the upper portion that is used to retain circular shapes positioned around cylindrical cargo.

The cargo restraining device 10 of the present invention is manufactured from readily available materials and simple in design. The preferred embodiment is comprised of plastic, rubber, elastomers, or combinations thereof; however, synthetic materials such as fiberglass or nylon; however, it is contemplated that other materials such as wood, corrugated paper, or graphite material may be substituted for or used in combination therewith. It is contemplated that other materials may also be used for fabrication of the cargo restraining device 10.

Referring now to the drawings, FIGS. 1, 8–10, and 27–28 show a preferred embodiment of the cargo restraining device 10 comprising a upper body support member 12 attached to a base 14. The support member 12 may be solid or preferably hollow to save weight and expense. The support member 12 forms a upper body portion or block which is solid, molded, extruded, or cut from material preferably a flexible polymer such as polyvinyl chloride, polyethylene, and/or more preferably a rubber compound. Moreover, the upper and/or base portion can be made of the following resins: Acrylonitrile Butadiene Styrene (ABS), Acetal, Acrylic, Ethylene Vinyl Acetate, Nylon, Polybutylene, Polycarbonate, Polyester, Polyetherimide, Polyethylene, Polyphenylene Oxide (PPO)/Styrene CO (NORYL), Polypropylene, Polystyrene, Polysulphone, Polyurethane, Polyvinyl Chloride (PVC), Styrene Acrylonitrile (SAN), and combinations thereof. The choice of material for the upper portion would depend on structural stability and physical characteristics desired or required. Epoxies, metal, wood, and etc. could be used for the upper body portion 14 and be functional; however, molding the piece out of a polymer is more economical.

Figure 22:
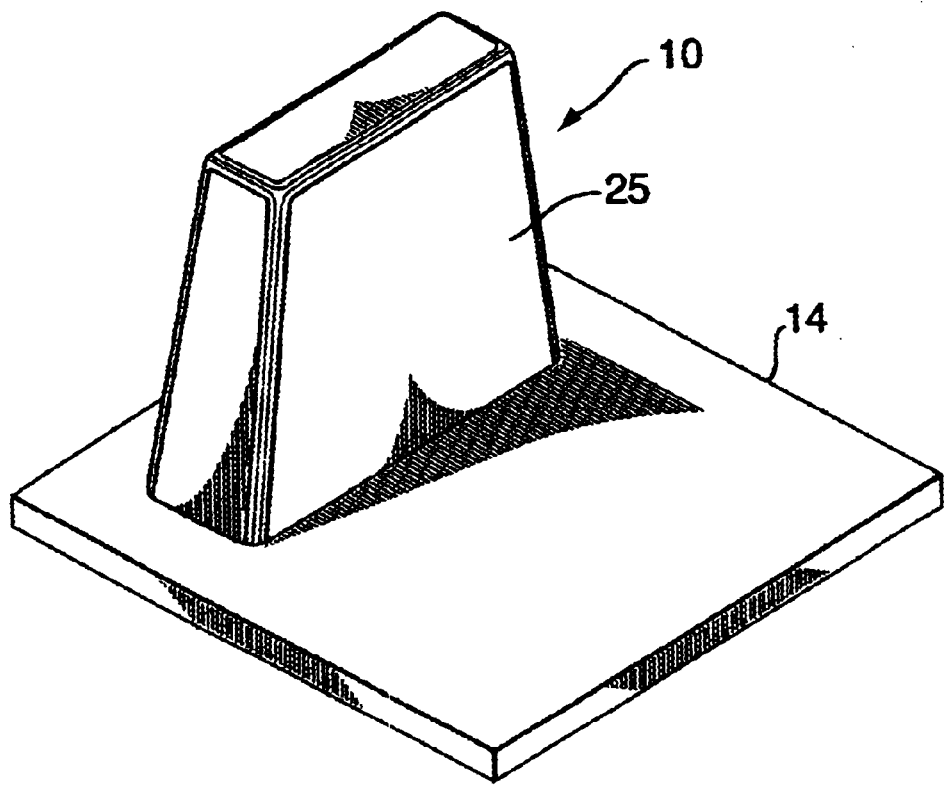
FIG. 22 shows a different shaped upper portion that is used to retain extra wide cargo in the center for additional support.
Figure 23:
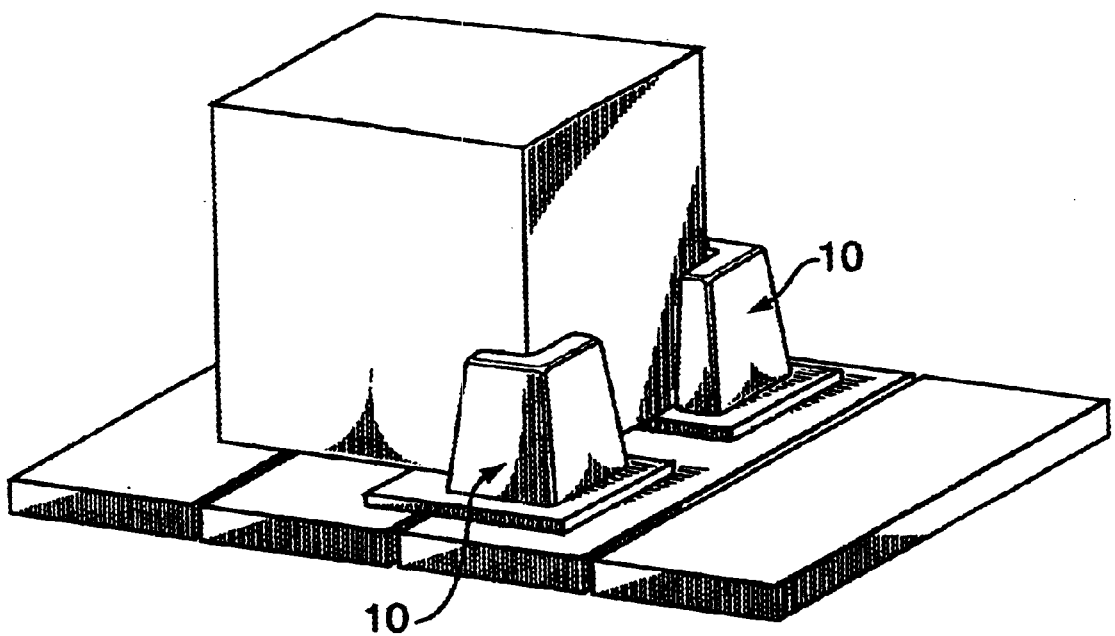
FIG. 23 is a perspective view thereof showing a pair of cargo restraining devices positioned with respect to the cargo shown in phantom lines.
Figure 24:
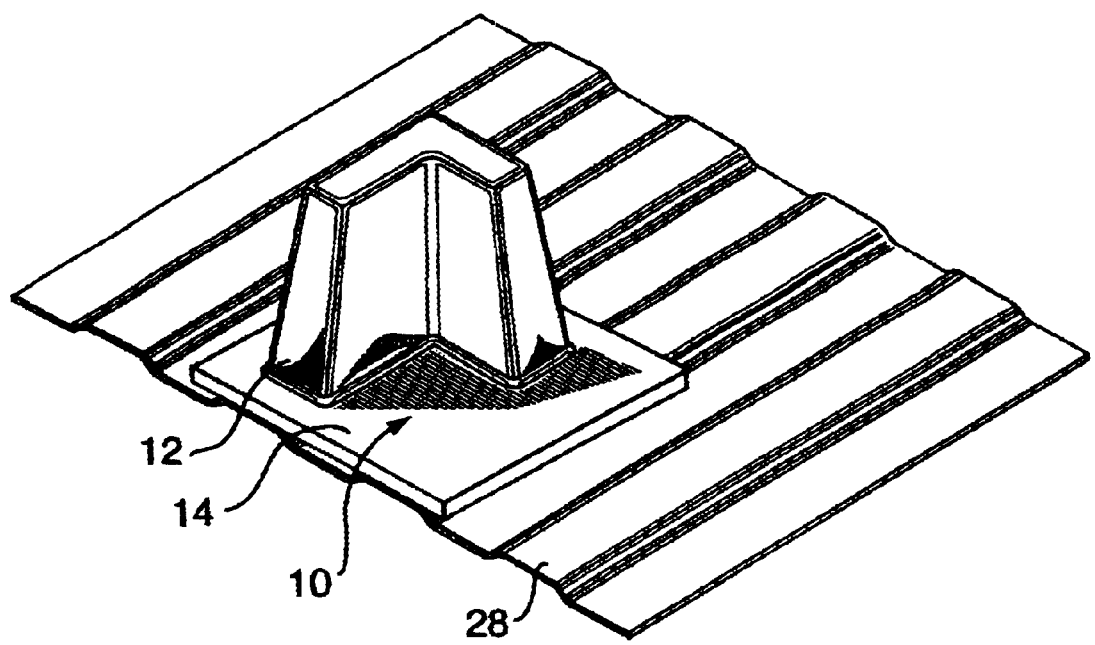
FIG. 24 is a perspective view of a common transporting surface of irregular shaped plastic truck bed and the restrain device with the cross-section view below.
Figure 25:
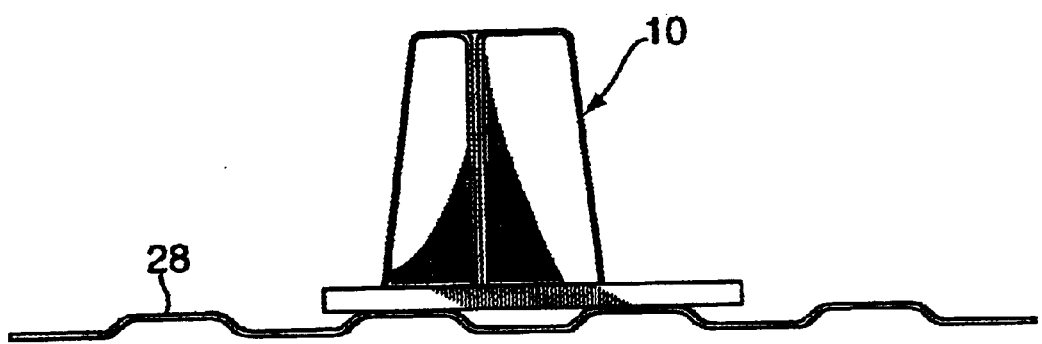
FIG. 25 is a side view of FIG. 24.
Figure 26:
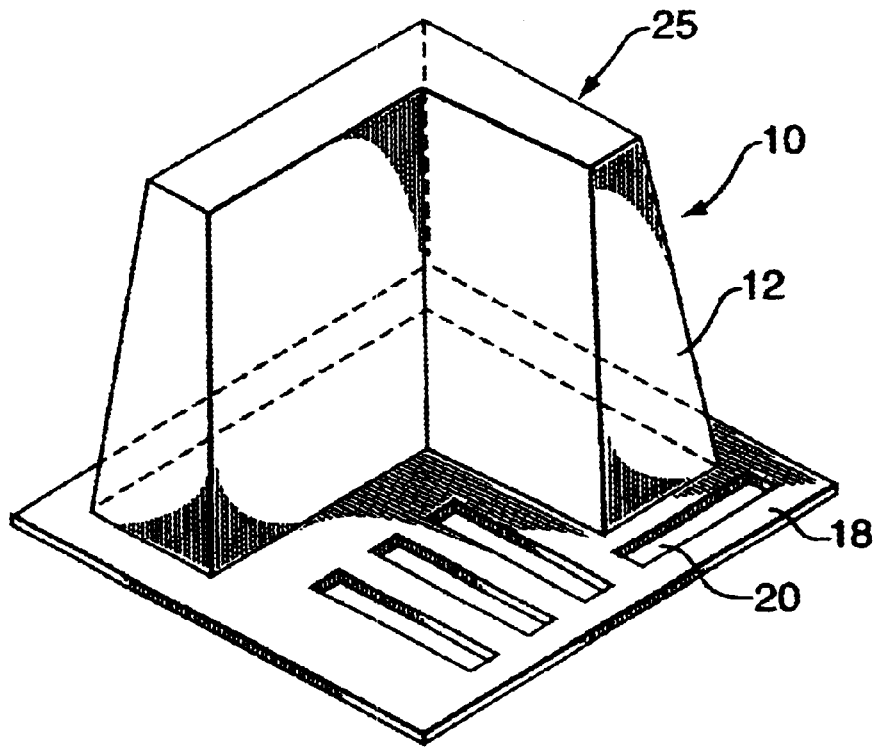
FIG. 26 is a partial cutaway perspective show showing a restraining device having an upper body portion with tapered sidewalls having a thicker portion near the base extending vertically from a reinforcement member having a plurality of slots formed therein.
Figure 27:
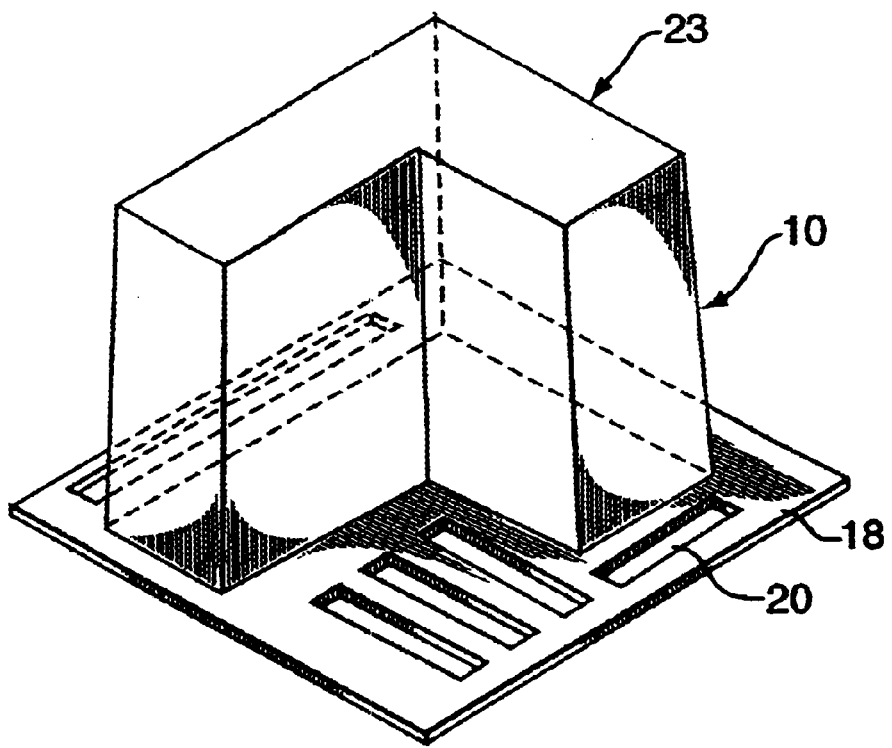
FIG. 27 is a partial cutaway perspective show showing a cargo restraining device having an upper body portion with sidewalls of equal thickness extending vertically from a reinforcement member having a plurality of slots formed therein.
Figure 28:
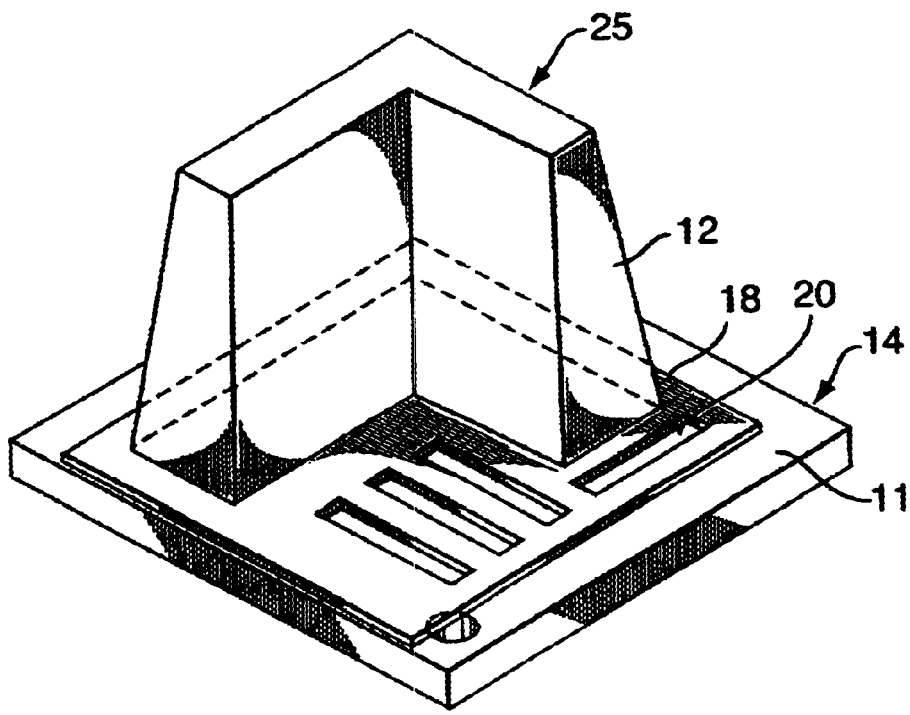
FIG. 28 is a partial cutaway view of FIG. 27 showing the holding body member extending upward from the reinforcement member embedded in a base.
Figure 29:
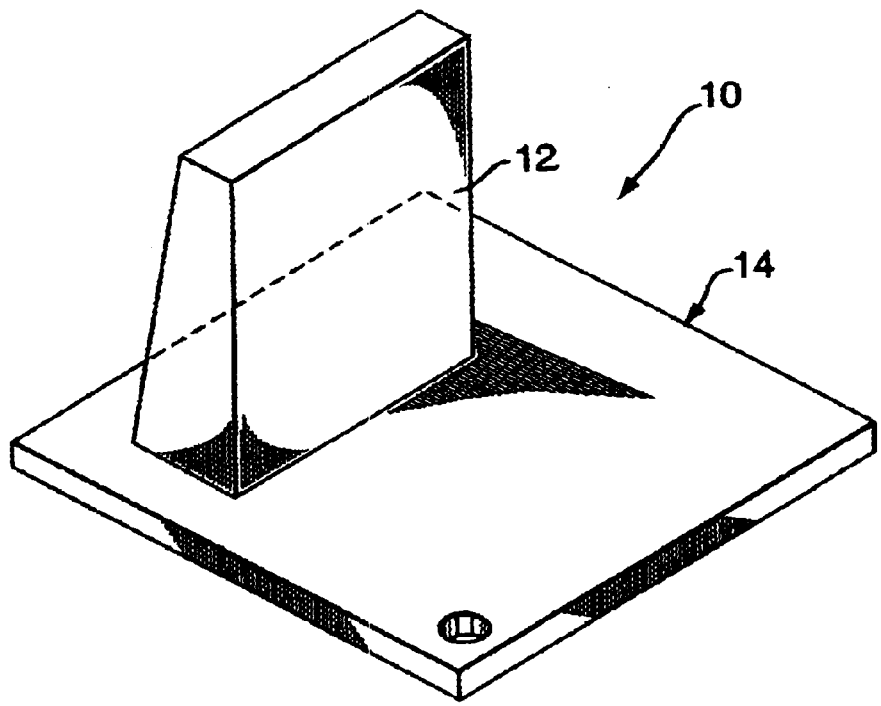
FIG. 29 is a perspective view of an embodiment of the present invention showing a tapered body member extending vertically upward from a planar base.
Figure 30:
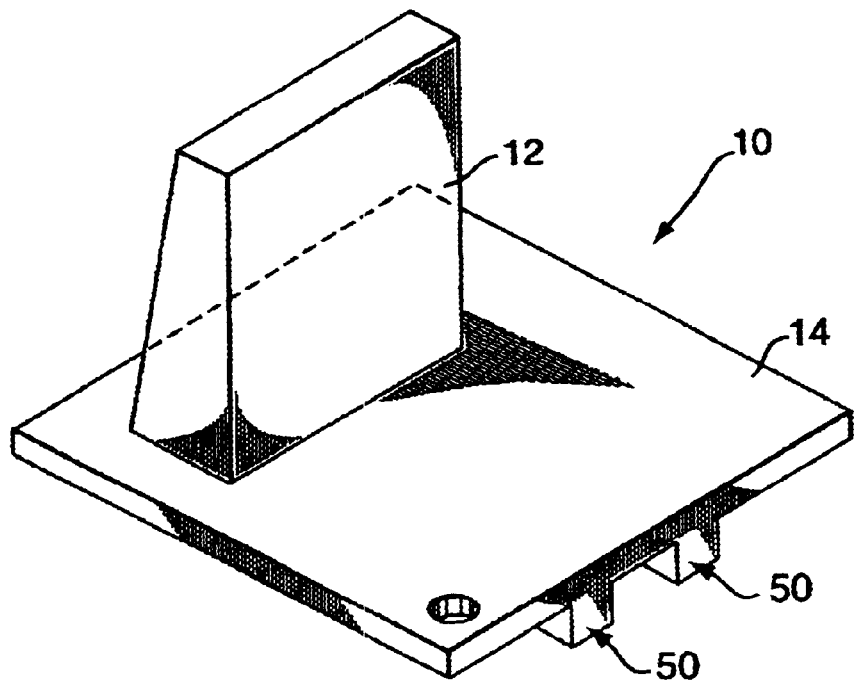
FIG. 30 is a perspective view of an embodiment of the cargo restraining device showing a tapered body member extending vertically upward from a planar base having a pair of spaced apart parallel leg members protruding downward from the surface of the base forming longitudinal rails.

The upper body portion 12 has a front face surface 15 for abutting the cargo package, a rear surface 17 connecting to the front face surface 15 by side surfaces 13 and a top surface 21. In one preferred embodiment as shown in FIGS. 1–8, the upper body support member 12 is formed in an "L" shape providing a pair of joining faces 15 for abutting the cargo to be held adjacent thereto, while in another embodiment the face is semi-circular. The upper body portion can be a simple rectangular block 23 shown in FIG. 27 or a tapered block having tapered side surfaces 13 connecting tapered rear surfaces 17 to vertical face surfaces 15 as shown in FIGS. 22, and 29–30. All of the embodiments having a tapered upper body support member 12 have the thicker portion at the intersection with the base 14 on the side opposite the side surface abutting the cargo. A base 14 of the preferred embodiment includes reinforcement member 18 consisting of a semi-rigid or rigid material such as hard plastic, wood, metal, graphite, fiberglass, nylon, polyester, or combinations thereof which is inserted, embedded, or formed within a softer resilient planar member 11 such as a polyvinyl chloride, polyurethane, polyethylene, rubber, member 18 of the base 14 maybe molded or formed integrally with the upper body member 12, 13 or attached together after forming by adhesives, welding, or other means of attachment. Moreover, a portion of the base 14 may be formed with the upper body portion 12 and the reinforcement member 18 sandwiched between the integral portion of the base and a planar surface attached to the base 14. The bottom surface of the base 14 may be covered with an adhesive and peelable or removable plastic or paper film for permanent attachment on the floor or bed of the vehicle; however, the preferred embodiment utilizes the frictional forces of the load and ability of the pliable material of the base to adhere to the floor of the vehicle and resist movement.

The reinforcement member 18 may inserted into a mold and the upper body support member 12, 13 and planar base member 11 may be formed of softer material molded around the reinforcement member 18 forming an integral cargo restraining device 10, the planar base member 11 of said base 14 can be coated with a soft pliable flexible material applied by dipping, molding, spraying, or painting. The planar base members 11 may also be formed having a slot or slit therein, or having a slot or slit cut therein, wherein a reinforcement member 18 may be inserted into the planar base member 14 to provide structural support.

The amount of void that exist in the reinforcement member 18. is only limited too maintain structural stability of the upper body portion 12, 13. The zone where two materials are mechanically locked together is the integral plane. The lower portion of the upper upper body support member 12, 13, and of the base 14 are an integral part of each in this zone and where energy that acts on either portion is simultaneously transferred. The advantage in forming or embedding the reinforcement member 18 within the base 14 is that the stress is dissipated over the entire support member 10 whereby both the materials comprising the upper body portion 13, reinforcement member 18, and base 14 would all have to fail together as a result of structural failure rather, whereas a support member 10 having components bonded together by an adhesive or bonding is dependent upon the strength of that adhesive or the bond. The other benefit of utilizing materials having selected properties is that it provides a means for selecting materials having a higher coefficient of friction on both the transporting surface and the cargo surface. This allows the lower portion to resist motion of cargo at all times and not only when force is acting on the upper portion. This allows increased friction to take place in a plane of contact and does not rely on the physical shape of the transporting surface to generate resistance.

It is contemplated that the upper body support member 12, 13 and base 14 including the reinforcement member 18 within the planar member 11 can be fabricated from one or more rigid materials and be coated with a urethane or other soft pliable material applied by dipping, molding, spraying, or painting.

The cargo or boxes are placed onto the base 14 abutting the face 15 of the upper body 12, 13 or the cargo restraining device 10. One or more cargo restraining devices 10 are usually used together to hold a parcel against the side wall(s) of a vehicle bed or floor 9, or a plurality of devices 10 are placed around the cargo box. The box is set at least partially on the base 14 so that the greater the weight of the box (load) the more force is exerted onto the base 14 for holding the upper body support member 12, 13 in place.

FIGS. 2–7 illustrate the transporting surfaces of vehicles commonly used to transport cargo. This includes painted metal surface of vehicle floor or bed 28, carpet 30 used in the trunks of cars, vans, and sport utility vehicles, wooden floor 32 used in trailers, and the plastic surface 34 of a truck bed liner. These surfaces will be use to show diversity of the device which is not limited to these material but what is commonly found in the cargo carrying area. The bottom view of these figures show the cross- sections of the transporting surfaces of painted metal, carpet, wood, and plastic. These figures show common contacting surfaces, which the device can be used on. It ranges from a flat textured surface, flat smooth surface, and irregular smooth surface.

Figure 31:
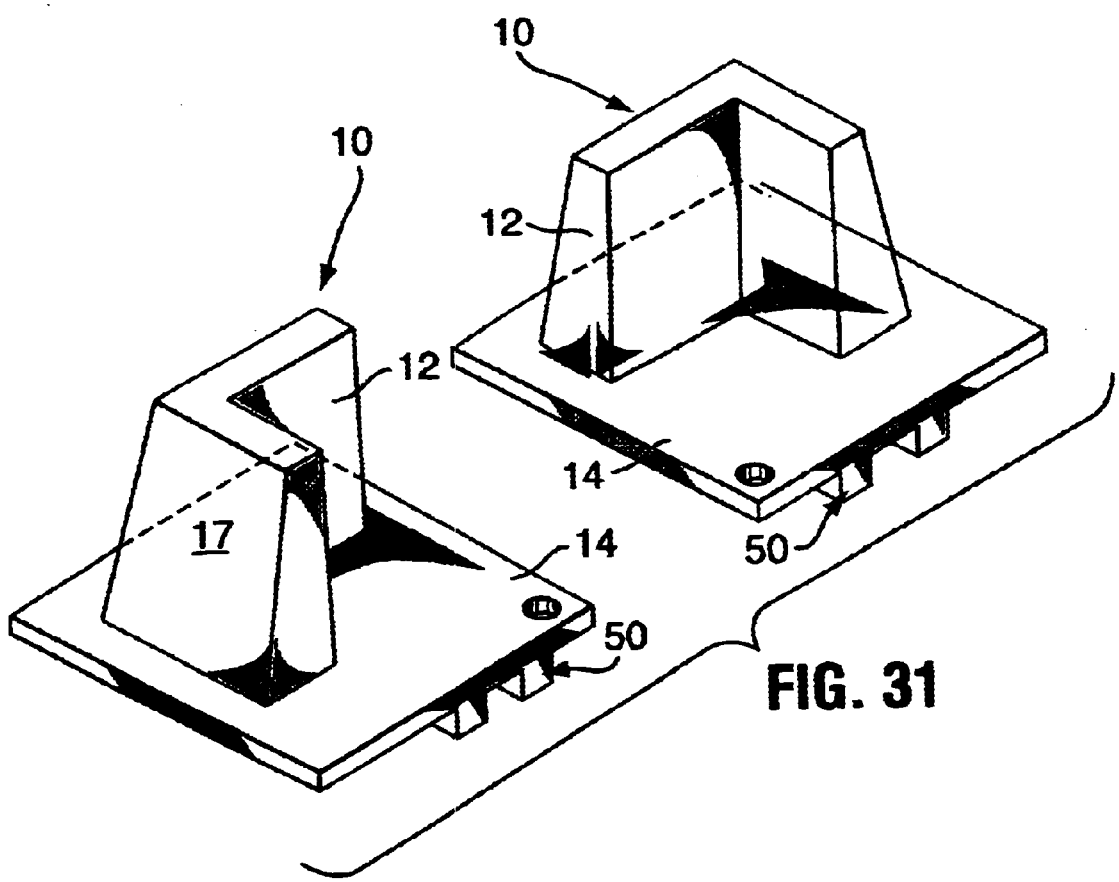
FIG. 31 is a perspective view of opposing embodiments of FIG. 6 having a pair of parallel leg members protruding downward from the surface of the base forming longitudinal rails.
Figure 32:
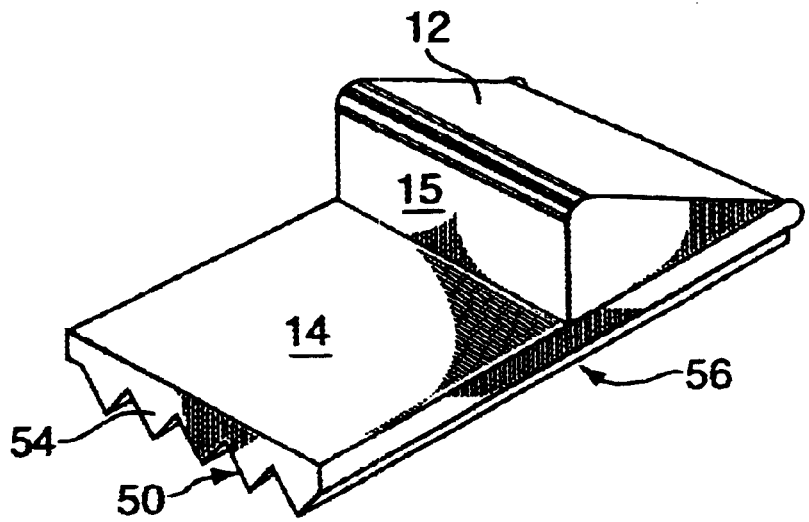
FIG. 32 is an embodiment of the present invention showing a base having a plurality of spaced apart parallel leg members protruding downward from the surface of the base forming longitudinal rails having triangular shaped cross sections and a wedged shaped upper body having a face normal to the rails.
Figure 33:
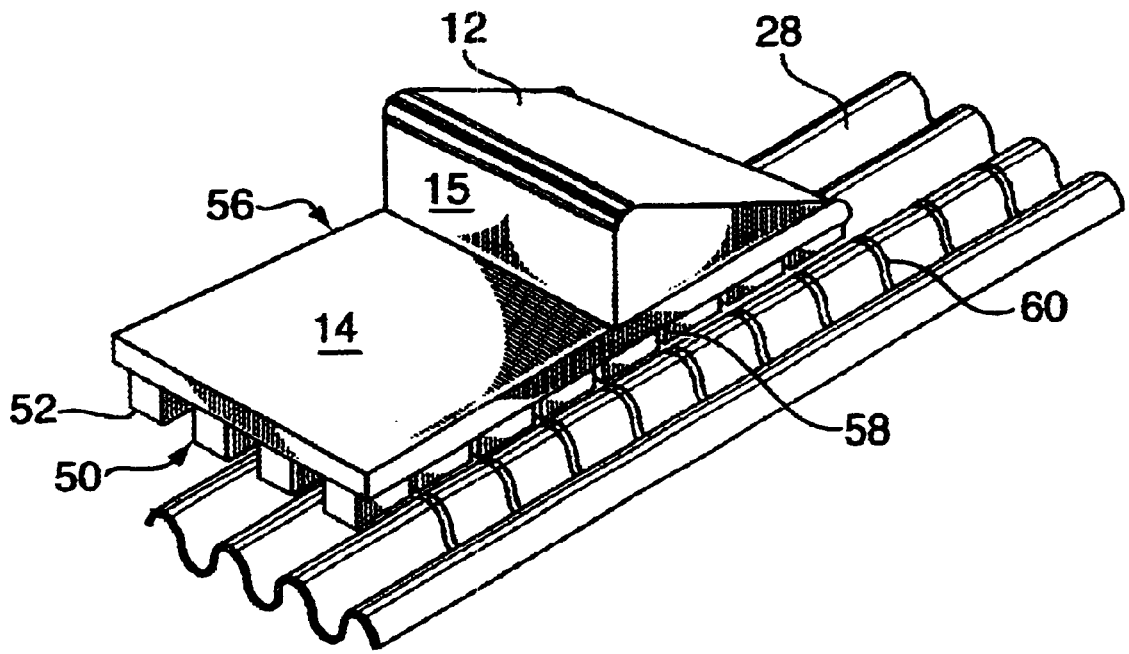
FIG. 33 is an embodiment showing a base having a plurality of spaced apart parallel leg members protruding downward from the surface of the base forming longitudinal rails having rectangular shaped cross sections and a wedged shaped upper body having a face normal to the rails being positioned above a cargo bed having grooves therein.
Figure 34:
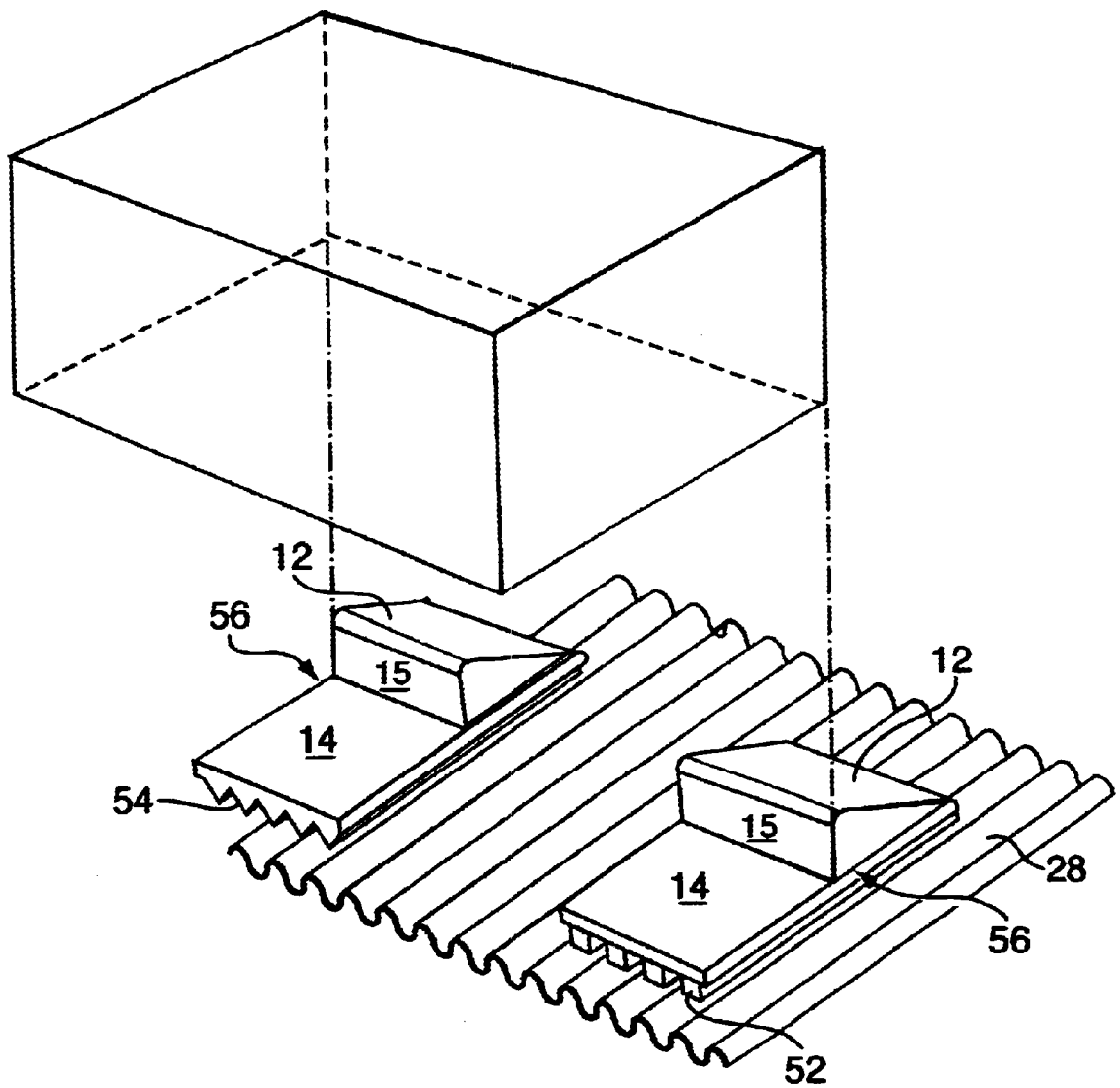
FIG. 34 is a perspective view of the embodiments of FIGS. 32 and 33 showing placement of cargo thereon.
Figure 37:
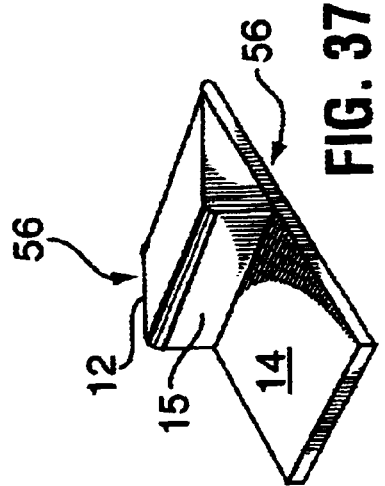
FIG. 37 shows the wedge shaped cargo restraining device having a planar base.
Figure 36:
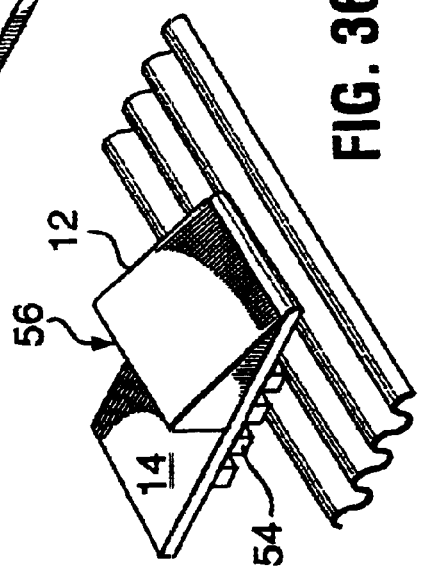
FIG. 36 shows the wedge shaped cargo restraining device having spaced apart parallel longitudinal rails extending parallel to the face of the wedge shaped upper body portion.
Figure 35:
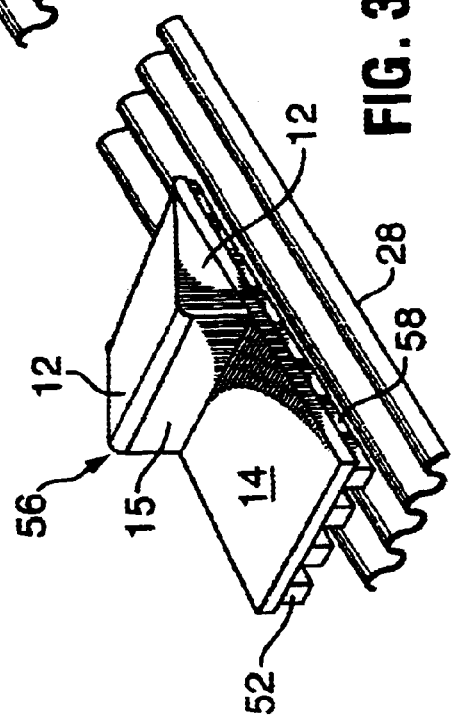
FIG. 35 is an embodiment of a wedge shaped cargo restraining device having spaced apart parallel rectangular sections forming protrusions extending from the bottom surface of the base.

FIGS. 11–14 show the restraining device of this invention together with the different textures that could be used on the bottom surface of the base 14 of the cargo restraining device 10. The lower surface can be formed as a smooth plane or selected textured surface to increase effectiveness; however, it is As shown in FIG. 31, any of the embodiments of the cargo restraining device 10 may also be formed having at least a pair of spaced apart parallel leg members 50 protruding downward from the bottom surface of the base forming longitudinal rails. The leg members 50 may be formed having a rectangular member 52 or have an angled member 54.

Figure 39:
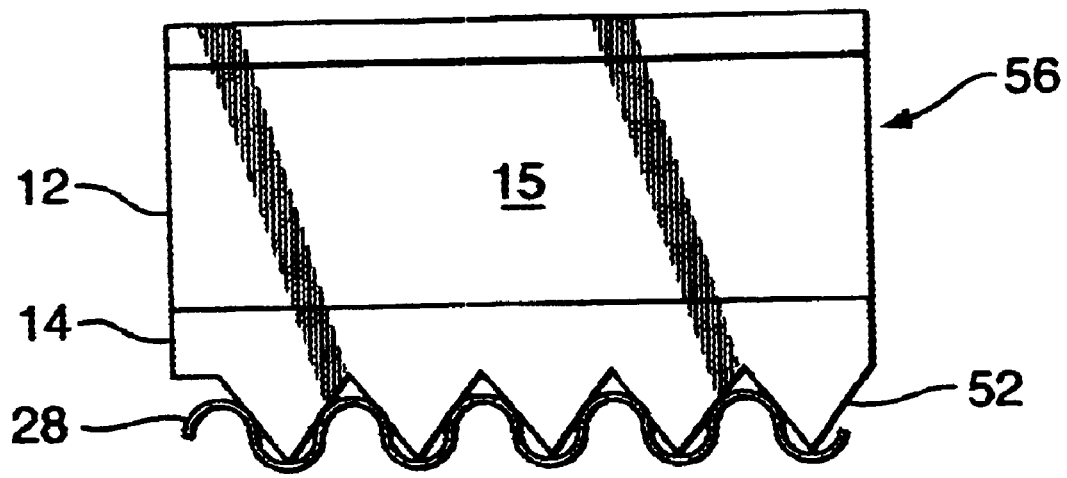
FIG. 39 is a front end view of FIG. 32 showing the rails resting within grooves formed in the bed of a vehicle.
Figure 40:
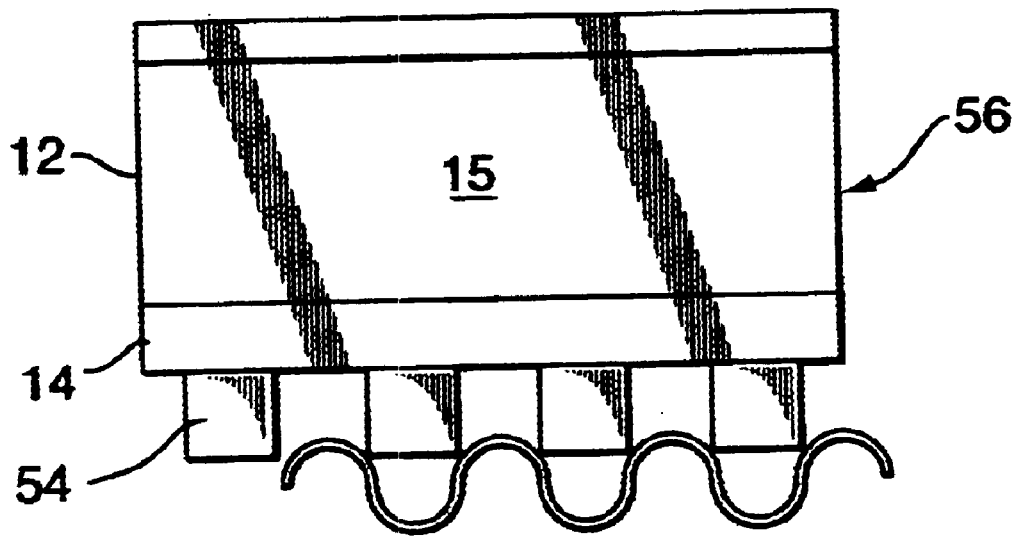
FIG. 40 is a front end view of FIG. 33 showing the rails extending above the grooves formed in the bed of a vehicle yet being biased from sliding thereon.

Furthermore, the leg members 50 forming spaced apart longitudinal rails may be sectioned and/or contain grooves or indentations 58 cut or molded therein normal to the longitudinal rails forming protrusions which could be cooperatively engaged with matching or similar shaped impressions 60 formed into the bed or bed liner of a vehicle or take advantage of the shape of the bed or floor 28 to further resist movement as shown in FIG. 39. It should be noted that the performance of the cargo restraining device 10, 56 is not dependent upon the legs 50 conforming of cooperatively engaging slots or grooves formed in the bed of floor 28 of a vehicle as shown in FIG. 40.

Figure 38:
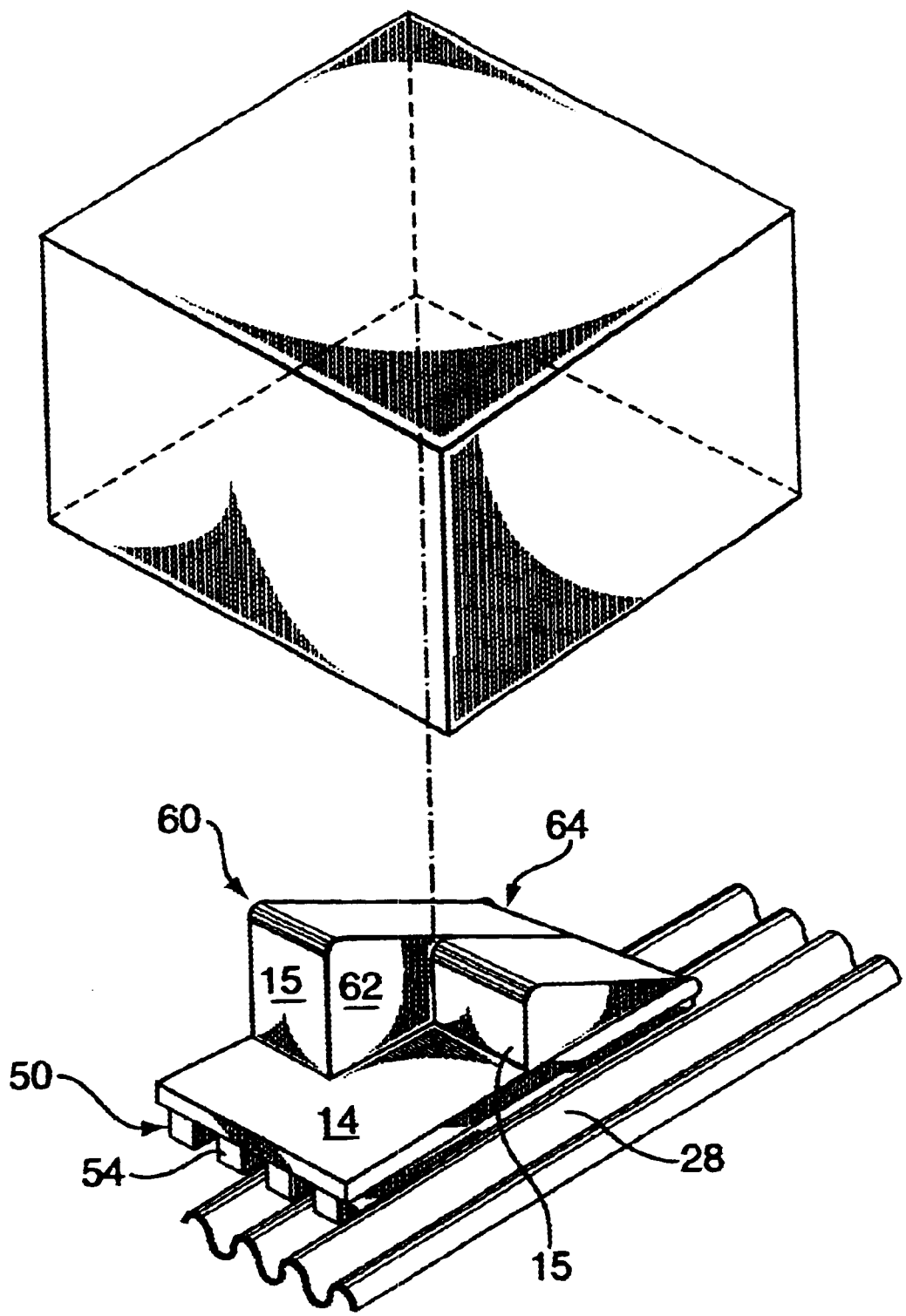
FIG. 38 is a perspective view of a cargo restraining device having an upper body double offset wedge providing a front and side support faces for abutting an object to be held stationary.

FIG. 38 is a perspective view of a cargo restraining device 61 having an upper body offset double wedge side portion 64 defining a pair of faces 15 normal to the legs 50 and an offset face 62 connecting the faces 15 providing base front to back and side to side register for abutting an object to be held stationary thereby.

I claim:

1. A cargo restraining device for resisting movement of a cargo container placed in a selected position on a vehicle floor or truck bed, comprising:

an upper body support member including a front face surface for abutting the cargo container, an opposing rear surface, a pair of side surfaces connecting said front face surface and said rear surface, a top surface connecting a top edge of said front face surface, said pair of side surfaces and said rear surface;

a bottom surface defining a planar base member extending outwardly past said front face surface for placement under a portion of the cargo container;

said bottom surface of said planar base member being flexible and comprising softer material than that of said upper body support member; and said bottom surface of said planar base member including an adhesive covered by a removable plastic or paper film for permanent attachment to a surface of the vehicle floor or truck bed.

2. The cargo restraining device of claim 1, including at least one reinforcing member embedded within said planar base member.

3. The cargo restraining device of claim 1, wherein said upper body support member is solid.

4. The cargo restraining device of claim 1, wherein said upper body support member is hollow.

5. The cargo restraining device of claim 1, wherein said upper body support member is tapered having a broader bottom edge than said top surface.

6. The cargo restraining device of claim 1, wherein said upper body support member is rigid.

7. The cargo restraining device of claim 1, wherein said upper body support member is selected from shapes consisting of an L-shaped member and a rectangular shape.

8. The cargo restraining device of claim 1, wherein said planar base member having a bottom surface having at least a portion thereof including a textured surface.

9. The cargo restraining device of claim 8, wherein said textured surface is selected from the group consisting of bars, grooves, hemisphere shaped projections, cylindrical protrusions, diamond shaped patterns, and a wave pattern.

10. The cargo restraining device of claim 1, wherein said upper body support member and said planar base member are molded from one or more polymers having different hardness wherein the upper body, support member comprises a more rigid polymer than said bottom surface of said planar base member.

11. The cargo restraining device of claim 1, wherein said bottom surface of said planar base member comprises material having a durometer range having a Shore A hardness (ASTM D2240).

12. The cargo restraining device of claim 1, wherein said planar base member is attached to said upper support member by molding, adhesion, welding, or attached by mechanical fastening means.

13. The cargo restraining device of claim 1, wherein at least a portion of said planar base member is coated with a soft pliable flexible material applied by dipping, molding, spraying, or painting.

14. The cargo restraining device of claim 1, said upper base and planar base member comprising material selected from the group including plastic, rubber, elastomers, fiberglass, nylon, wood, corrugated paper, carbon fiber, polyvinyl chloride, polyethylene, acrylonitrile butadiene styrene (ABS), acetal, acrylic, ethylene vinyl acetate, polybutylene, polycarbonate, polyester, polyetherimide, polyethylene, polyphenylene oxide (PPO) /styrene copolymer (NORYL), polypropylene, polystyrene, polysulphone, polyurethane, and styrene acrylonitrile.

15. The cargo restraining device of claim 1, wherein said planar base member includes a reinforcing member therein.

16. The cargo restraining device of claim 15, wherein said reinforcing member includes at least one aperture therein for reducing the weight thereof and providing integral bonding with said planar base member.

17. The cargo restraining device of claim 15, wherein said reinforcing member is embedded within said planar base member.

18. The cargo restraining device of claim 15, wherein said reinforcing member is formed integrally within said planar base member by molding therein.

19. The cargo restraining device of claim 15, wherein said reinforcing member comprises material having greater rigidity than said upper body support.

20. The cargo restraining device of claim 15, wherein said reinforcing member comprises a material selected from the group including plastic, wood, metal, graphite, fiberglass, nylon, and polyester.

21. The cargo restraining device of claim 15, wherein said planar base member includes a horizontal slit therein and said reinforcing member is inserted within said slit.

22. A cargo restraining device for resisting movement of a cargo container placed in a selected position on a vehicle floor or truck bed, comprising:

an upper body support member including a front face surface for abutting the cargo container, an opposing rear surface, a pair of side surfaces connecting said front face surface and said rear surface, a top surface connecting a top edge of said front face surface, said pair of side surfaces and said rear surface;

a planar base member having a top surface connecting to a bottom edge of said front face surface, said rear face surface, and said pair of side surfaces of said upper body support member, said planar base member including at least a portion thereof extending outwardly past said front face surface for placement under a portion of the cargo container;

at least one reinforcing member supporting said planar base member, said reinforcing member comprising material having greater rigidity than said planar base member; and said planar base member having a bottom surface which is flexible and comprising softer material than that of said upper body support member.

23. The cargo restraining device of claim 22, wherein said reinforcing member is embedded within said planar base member.

24. The cargo restraining device of claim 22, wherein said upper body support member is angled inwardly at a selected acute angle with respect to a y-axis.

25. A cargo restraining device for resisting movement of a cargo container placed in a selected position on a vehicle floor or truck bed, comprising:

an upper body support member including a front face surface for abutting the cargo container, an opposing rear surface, a pair of side surfaces connecting said front face surface and said rear surface, a top surface connecting a top edge of said front face surface, said pair of side surfaces and said rear surface;

a planar base member having a top surface connecting to a bottom edge of said front face surface, said rear face surface, and said pair of side surfaces of said upper body support member, said planar base member including at least a portion thereof extending outwardly past said front face surface for placement under a portion of the cargo container;

at least one reinforcing member supporting said planar base member, said reinforcing member comprising material having greater rigidity than said planar base member; and a bottom surface of said planar base member including an adhesive covered by a removable plastic or paper film.

26. A cargo restraining device for resisting movement of a cargo container placed in a selected position on a vehicle floor or truck bed, comprising:

an upper body support member including a front face surface for abutting the cargo container, an opposing rear surface, a pair of side surfaces connecting said front face surface and said rear surface, a top surface connecting a top edge of said front face surface, said pair of side surfaces and said rear surface;

a planar base member having a top surface connecting to a bottom edge of said front face surface, said rear face surface, and said pair of side surfaces of said upper body support member, said planar base member including at least a portion thereof extending outwardly past said front face surface for placement under a portion of the cargo container;

at least one reinforcing member supporting said planar base member, said reinforcing member comprising material having greater rigidity than said planar base member; and said bottom edge of said front face surface, said rear face surface, and said pair of side surfaces of said upper body support member is thicker than said top edge of said front face surface, said pair of side surfaces and said rear surface of said upper body support member.

27. A cargo restraining device for resisting movement of a cargo container placed in a selected position on a vehicle floor or truck bed, comprising:

an upper body support member including a front face surface for abutting the cargo container, an opposing rear surface, a pair of side surfaces connecting said front face surface and said rear surface, a top surface connecting a top edge of said front face surface, said pair of side surfaces and said rear surface;

a planar base member having a top surface connecting to a bottom edge of said front face surface, said rear face surface, and said pair of side surfaces of said upper body support member, said planar base member including at least a portion thereof extending outwardly past said front face surface for placement under a portion of the cargo container;

at least one reinforcing member supporting said planar base member, said reinforcing member comprising material having greater rigidity than said planar base member; and said side surfaces of said upper body support member extend upwardly and are angled inwardly from a bottom surface to said top surface.

28. A cargo restraining device for resisting movement of a cargo container having sidewalls interconnecting with a bottom surface placed in a selected position on a vehicle floor or truck bed, comprising:

an upper body support member including a front face surface, an opposing rear surface, a pair of side surfaces connecting said front face surface and said rear surface, and a top surface, interconnecting said front face surface, said rear surface and said pair of side surfaces;

a base comprising a planar base member defining a top surface and a bottom surface, said base member bottom surface including at least one reinforcing member, said reinforcing member is formed inserted within said planar base member wherein said reinforcing member is surrounded by said planar base member;

said upper body support member having a bottom edge attaching to said top surface of said planar base member and extending upwardly substantially normal therefrom, wherein at least a portion of said planar base member is extending outwardly past said bottom edge of said upper body support member;

whereby said front face surface is abutting at least one of the sidewalls of the cargo container and a portion of the bottom surface of the cargo container is resting on said at least a portion of said planar base member extending outwardly past said bottom edge of said upper body support member; and said reinforcing member is molded integrally within said planar base member.

29. The cargo restraining device of claim 28, wherein said reinforcing member comprises material having greater rigidity than said upper body support member.

30. The cargo restraining device of claim 28, wherein said reinforcing member is selected from the group consisting of the group including plastic, wood, metal, graphite, fiberglass, nylon, and polyester.

31. The cargo restraining device of claim 28, wherein said reinforcing member includes at least one aperture therein for reducing the weight thereof.

32. The cargo restraining device of claim 28, wherein said planar base member extends under and around said bottom edge of said upper body support member.

33. The cargo restraining device of claim 28, wherein said at least one reinforcing member is embedded within said planar base member.

34. The cargo restraining device of claim 28, wherein said upper body support member is solid.

35. The cargo restraining device of claim 28, said upper base support member and said planar base member comprise material selected from the group including plastic, rubber, elastomers, fiberglass, nylon, wood, corrugated paper, carbon fiber, polyvinyl chloride, polyethylene, acrylonitrile butadiene styrene (ABS), acetal, acrylic, ethylene vinyl acetate, polybutylene, polycarbonate, polyester, polyetherimide, polyethylene, polyphenylene oxide (PPO)/styrene copolymer (NORYL), polypropylene, polystyrene, polysulphone, polyurethane, and styrene acrylonitrile.

36. The cargo restraining device of claim 28, wherein said upper body support member is hollow.

37. The cargo restraining device of claim 28, wherein said upper body support member is rigid.

38. The cargo restraining device of claim 28, wherein said upper body support member is selected from shapes consisting of a L-shaped member and a rectangular shape.

39. The cargo restraining device of claim 28, at least a portion of said bottom surface of said planar base member includes a textured surface.

40. The cargo restraining device of claim 39, wherein said textured surface is selected from the group consisting of bars, grooves, hemisphere shaped projections, cylindrical protrusions, diamond shaped patterns, and a wave pattern.

41. The cargo restraining device of claim 28, wherein said planar base member comprises softer material than that of said upper body support member.

42. The cargo restraining device of claim 28, wherein said bottom surface of said planar base member comprises material having a durometer range of a Shore A hardness (ASTM D2240).

43. The cargo restraining device of claim 28, wherein said upper body support member is integral with said planar base member.

44. A cargo restraining device for resisting movement of a cargo container having sidewalls interconnecting with a bottom surface placed in a selected position on a vehicle floor or truck bed, comprising:

an upper body support member including a front face surface, an opposing rear surface, a pair of side surfaces connecting said front face surface and said rear surface, and a top surface, interconnecting said front face surface, said rear surface and said pair of side surfaces;

a base comprising a planar base member defining a top surface and a base member bottom surface, said base member bottom surface including at least one reinforcing member, said reinforcing member is formed inserted within said planar base member wherein said reinforcing member is surrounded by said planar base member;

said upper body support member having a bottom edge attaching to said top surface of said planar base member and extending upwardly substantially normal therefrom, wherein at least a portion of said planar base member is extending outwardly past said bottom edge of said upper body support member;

whereby said front face surface is abutting at least one of the sidewalls of the cargo container and a portion of the bottom surface of the cargo container is resting on said at least a portion of said planar base member extending outwardly past said bottom edge of said upper body support member; and wherein at least a portion of said planar base member is coated with a soft pliable flexible material applied by dipping, molding, spraying, or painting.

\* \* \* \* \*